United States Patent
Dudar

(10) Patent No.: US 11,287,354 B2
(45) Date of Patent: *Mar. 29, 2022

(54) SYSTEMS FOR DIAGNOSTICS OF A VARIABLE DISPLACEMENT ENGINE

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 40 days.

This patent is subject to a terminal disclaimer.

(21) Appl. No.: 16/737,750

(22) Filed: Jan. 8, 2020

(65) Prior Publication Data

US 2020/0141835 A1 May 7, 2020

Related U.S. Application Data

(62) Division of application No. 15/659,319, filed on Jul. 25, 2017, now Pat. No. 10,571,366.

(51) Int. Cl.

| | |
|---|---|
| *G01M 15/10* | (2006.01) |
| *F02D 41/22* | (2006.01) |
| *F02D 41/14* | (2006.01) |
| *G01M 15/04* | (2006.01) |
| *F02D 41/00* | (2006.01) |
| *F02D 13/06* | (2006.01) |
| *F02D 41/18* | (2006.01) |
| *F02N 11/04* | (2006.01) |
| *F02D 41/04* | (2006.01) |

(52) U.S. Cl.
CPC ....... *G01M 15/106* (2013.01); *F02D 41/1445* (2013.01); *F02D 41/221* (2013.01); *G01M 15/042* (2013.01); *F02D 13/06* (2013.01); *F02D 41/0087* (2013.01); *F02D 41/042* (2013.01); *F02D 41/1448* (2013.01); *F02D 41/18* (2013.01); *F02D 2041/0012* (2013.01); *F02D 2200/0406* (2013.01); *F02D 2250/24* (2013.01); *F02N 11/04* (2013.01)

(58) Field of Classification Search
CPC .......................... G01M 15/042; G01M 15/106
See application file for complete search history.

(56) References Cited

U.S. PATENT DOCUMENTS

| | | | |
|---|---|---|---|
| 5,417,109 A | 5/1995 | Scourtes | |
| 5,644,073 A | 7/1997 | Matsuno et al. | |
| 7,171,929 B2 * | 2/2007 | Dosdall | F01L 1/34 |
| | | | 123/90.15 |
| 7,546,827 B1 | 6/2009 | Wade et al. | |
| 8,006,670 B2 | 8/2011 | Rollinger et al. | |

(Continued)

*Primary Examiner* — Eric S. McCall
(74) *Attorney, Agent, or Firm* — Geoffrey Brumbaugh; McCoy Russell LLP

(57) ABSTRACT

Methods and systems are provided for diagnostics of a cylinder valve actuation mechanism in a variable displacement engine (VDE). In one example, during an engine-off condition, the engine may be rotated unfueled, via a starter motor, and a reference exhaust air flow may be estimated. One or more deactivatable engine cylinders may then be deactivated and degradation of the cylinder valve actuation mechanism may be indicated based on a difference between the exhaust air flow following the cylinder deactivation and the reference exhaust air flow.

13 Claims, 6 Drawing Sheets

(56) References Cited

U.S. PATENT DOCUMENTS

| | | |
|---|---|---|
| 8,667,835 B2 | 3/2014 | Doering et al. |
| 8,996,285 B2 | 3/2015 | Baek |
| 10,094,034 B2 | 10/2018 | Graham et al. |
| 10,233,856 B2 | 3/2019 | Dudar |
| 2009/0048729 A1 | 2/2009 | Waters et al. |
| 2010/0175462 A1 | 7/2010 | Doering et al. |
| 2010/0175463 A1 | 7/2010 | Doering et al. |
| 2011/0019658 A1 | 1/2011 | Akaishi |
| 2011/0137509 A1 | 6/2011 | Sarac |
| 2015/0198104 A1 | 7/2015 | Haehara et al. |
| 2018/0274471 A1 | 9/2018 | Dudar |
| 2019/0186401 A1* | 6/2019 | Dudar ................ F02D 41/0087 |

* cited by examiner

SYSTEMS FOR DIAGNOSTICS OF A VARIABLE DISPLACEMENT ENGINE

CROSS REFERENCE TO RELATED APPLICATION

The present application is a divisional of U.S. Non-Provisional patent application Ser. No. 15/659,319, entitled "SYSTEMS AND METHODS FOR DIAGNOSTICS OF A VARIABLE DISPLACEMENT ENGINE," and filed on Jul. 25, 2017. The entire contents of the above-referenced application are hereby incorporated by reference for all purposes.

FIELD

The present description relates generally to methods and systems for diagnosis of a cylinder valve actuation mechanism in a variable displacement engine (VDE).

BACKGROUND/SUMMARY

Some engines, known as variable displacement engines (VDE), may be configured to operate with a variable number of active and deactivated cylinders to increase fuel economy. Therein, a portion of the engine's cylinders may be disabled during selected conditions defined by parameters such as a speed/load window, as well as various other operating conditions including engine temperature. An engine control system may disable a selected group of cylinders, such as a bank of cylinders, through the control of a plurality of cylinder valve actuators that affect the operation of each cylinder's intake and exhaust valves. By deactivating engine cylinders at low speeds/light loads, associated pumping losses may be minimized, and engine efficiency may be increased.

In some instances, the mechanisms that actuate the deactivatable cylinder valves (e.g., VDE mechanisms, or VDE actuators) may degrade, leaving the intake and/or exhaust valves operating as though the cylinder was still active. As such, there is an increased propensity for exhaust valve degradation relative to intake valve degradation due to carbon from the exhaust gas depositing on the exhaust valve. In this situation, fuel economy may be impacted as the inability to seal the cylinder during deactivation results in pumping losses. Drivability may also be adversely impacted as unaccounted air or vapor may be directed through the catalyst from the leaky cylinder. This issue may be addressed by monitoring VDE mechanism functionality and timely identifying and addressing VDE degradation.

Various approaches have been identified for diagnosing degradation of VDE operation, such as diagnostic methods based on crankshaft vibrations related to engine firing order, firing frequency, measuring manifold pressure, etc. One example approach is shown by Doering et al. in U.S. Pat. No. 8,667,835, where indication of intake and/or exhaust valve degradation in a VDE engine is based on an estimation of manifold pressure over a plurality of immediately successive induction events. The manifold pressure response during the intake stroke of each cylinder may be monitored and an average change in manifold pressure in a defined sampling window of an intake stroke may be used to identify degradation in valve activation/deactivation mechanisms.

However, the inventors herein have recognized several disadvantages with such approaches. As an example, such approaches may be computationally intensive, requiring a plurality of MAP measurements and extensive data manipulation to perform the VDE system diagnostic while the engine is running. As another example, such approaches may not be able to distinguish between a cylinder with a portion of the cylinder valves functionally degraded and a cylinder with all of the cylinder valves functionally degraded. In yet another example, additional sensors may be required to monitor certain engine parameters in order to diagnose degradation of the VDE mechanisms, leading to increased cost. Further still, the approach may require engine operation in a VDE mode which may be limited during strictly city driving or during engine operating under heavy loads. Due to the VDE mechanisms not being actuated regularly, opportunities for diagnosing VDE degradation may be limited.

In one example, the issues described above may be at least partly addressed by an engine method comprising: responsive to a request to diagnose a cylinder valve actuator during a non-fueling condition of the engine, spinning the engine, unfueled, with all cylinders activated to determine a reference air flow amount, and then, selectively deactivating one or more cylinder valves, and indicating cylinder valve actuator degradation based on an air flow amount following the deactivating relative to a threshold, the threshold based on the reference air flow amount. In this way, degradation of the VDE mechanism may be detected using less computation and while relying on existing sensors.

As one example, during engine non-combusting conditions, such as after vehicle key-off, the engine may be cranked unfueled with the VDE mechanism of all cylinders activated. A delta pressure across an exhaust particulate filter (PF), which is indicative of air flow through an exhaust passage (herein also referred to as exhaust air flow), may be monitored via a delta pressure sensor coupled to the PF. Once the exhaust air flow reaches a steady state, one or more cylinders of the VDE may be selectively deactivated via their respective VDE mechanism. The one or more cylinders may be concurrently deactivated or each deactivatable cylinder in the VDE may be sequentially deactivated. Due to deactivation of one or more cylinders, there may be a corresponding decrease in exhaust air flow which may change the delta pressure across the PF. If after deactivation of the one or more cylinders it is determined that the delta pressure has not changed appreciably, a degradation in the VDE mechanism may be indicated and a diagnostic code may be set. Further, if after deactivation of one or more cylinders it is determined that the delta pressure has changed but continues to remain above a threshold delta pressure, it may be inferred that there is a partial degradation of the VDE mechanism (such as a leak in one of the cylinder valves) causing airflow through the cylinder(s) even during cylinder deactivation. Upon detection of VDE mechanism degradation, the engine may be operated with all cylinders active for at least the immediately subsequent engine cycle.

In this way, changes in air flow through an exhaust passage may be correlated with valve events to diagnose a VDE mechanism. By leveraging an existing delta pressure sensor to detect degradation of a VDE mechanism, the cost associated with the diagnostic may be reduced. By diagnosing the VDE mechanism during vehicle key-off, VDE health monitoring may be carried out opportunistically without having to wait for VDE conditions to be met. The technical effect of evaluating the VDE system during an engine unfueled condition with minimal data collection is that diagnostics may be performed independent of an operator's driving habits and without affecting drivability. Also, by comparing delta pressure across a PF during VDE and non-VDE modes, potential degradation of the VDE mechanisms may be assessed without extensive computational requirements.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 5:
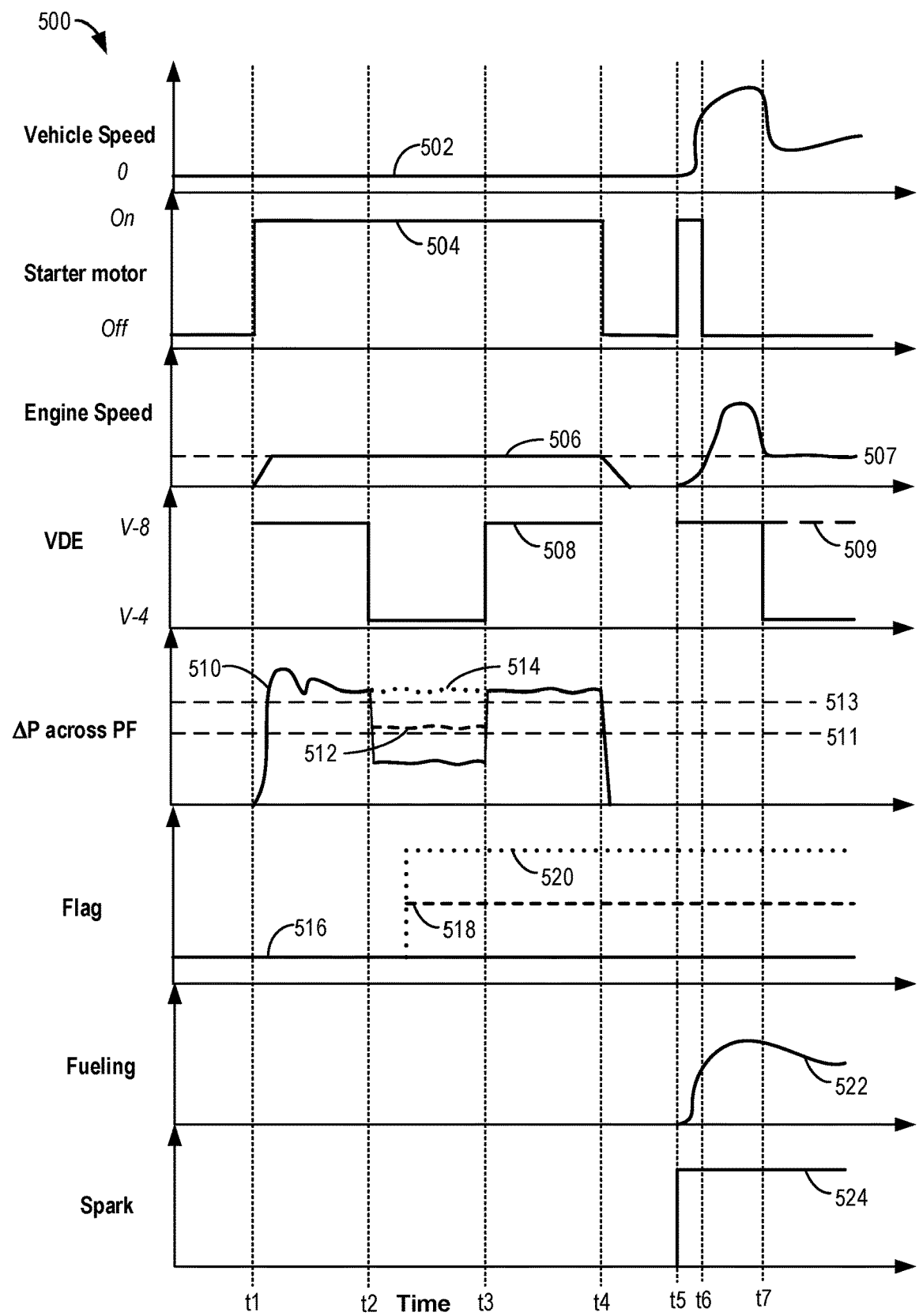
FIG. 5 shows an example of VDE system diagnostics performed during an ignition-off, fuel-off condition.
Figure 6:
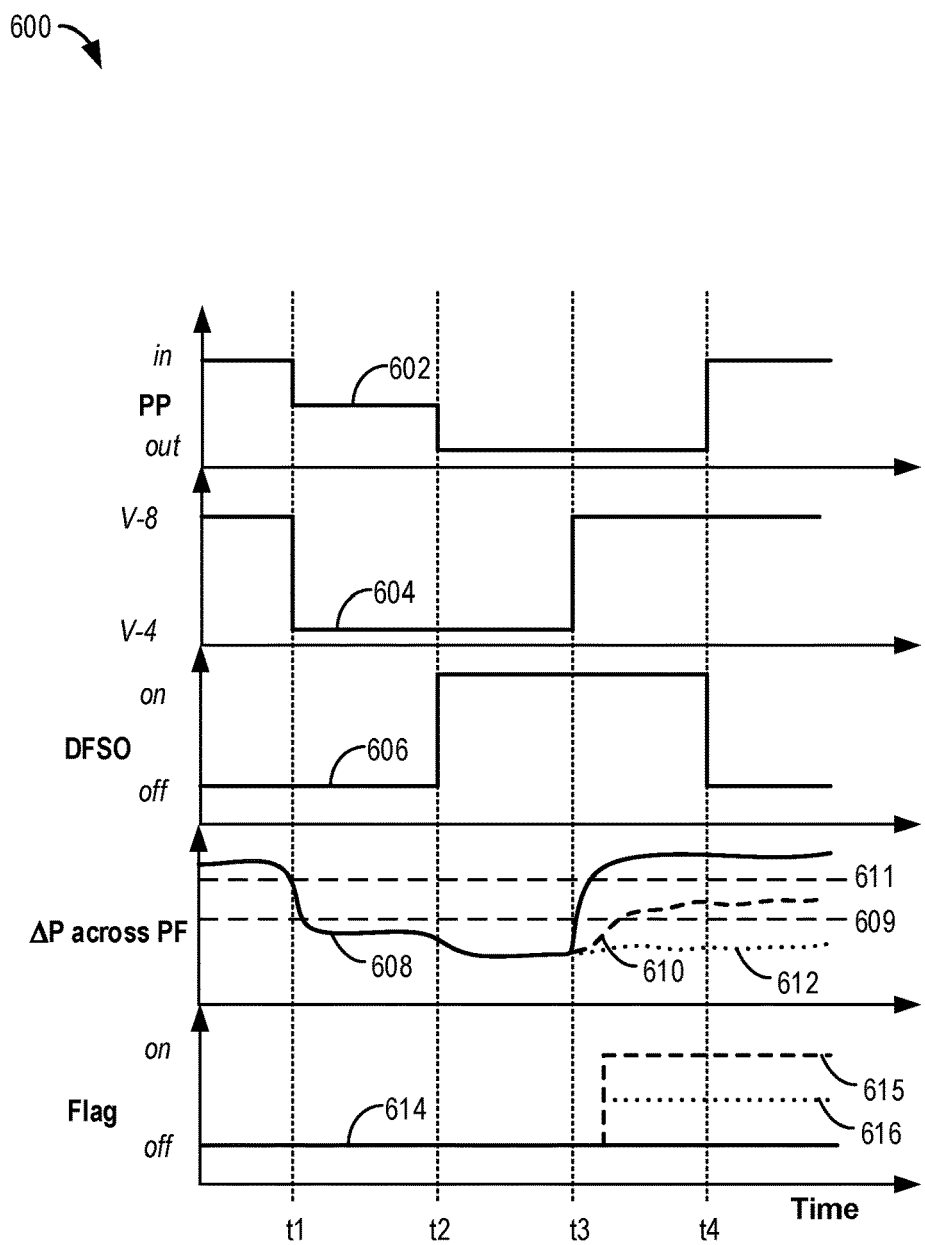
FIG. 6 shows an example of VDE system diagnostics performed during a DFSO condition.

The following description relates to systems and methods for diagnostics of a variable displacement mechanism in a variable displacement engine (VDE). As described with reference to the example engine system shown in FIGS. 1-2, selective cylinder deactivation in a VDE allows for an engine displacement to be varied. An engine controller may be configured to perform a control routine, such as the example routines of FIGS. 3-4, to identify degradation of the deactivatable cylinder valves comprising the VDE mechanism during non-fueling conditions such as engine-off and DFSO. Examples of diagnostics of the VDE mechanism carried out during non-fueling engine conditions are shown in FIGS. 5-6.

Figure 1:
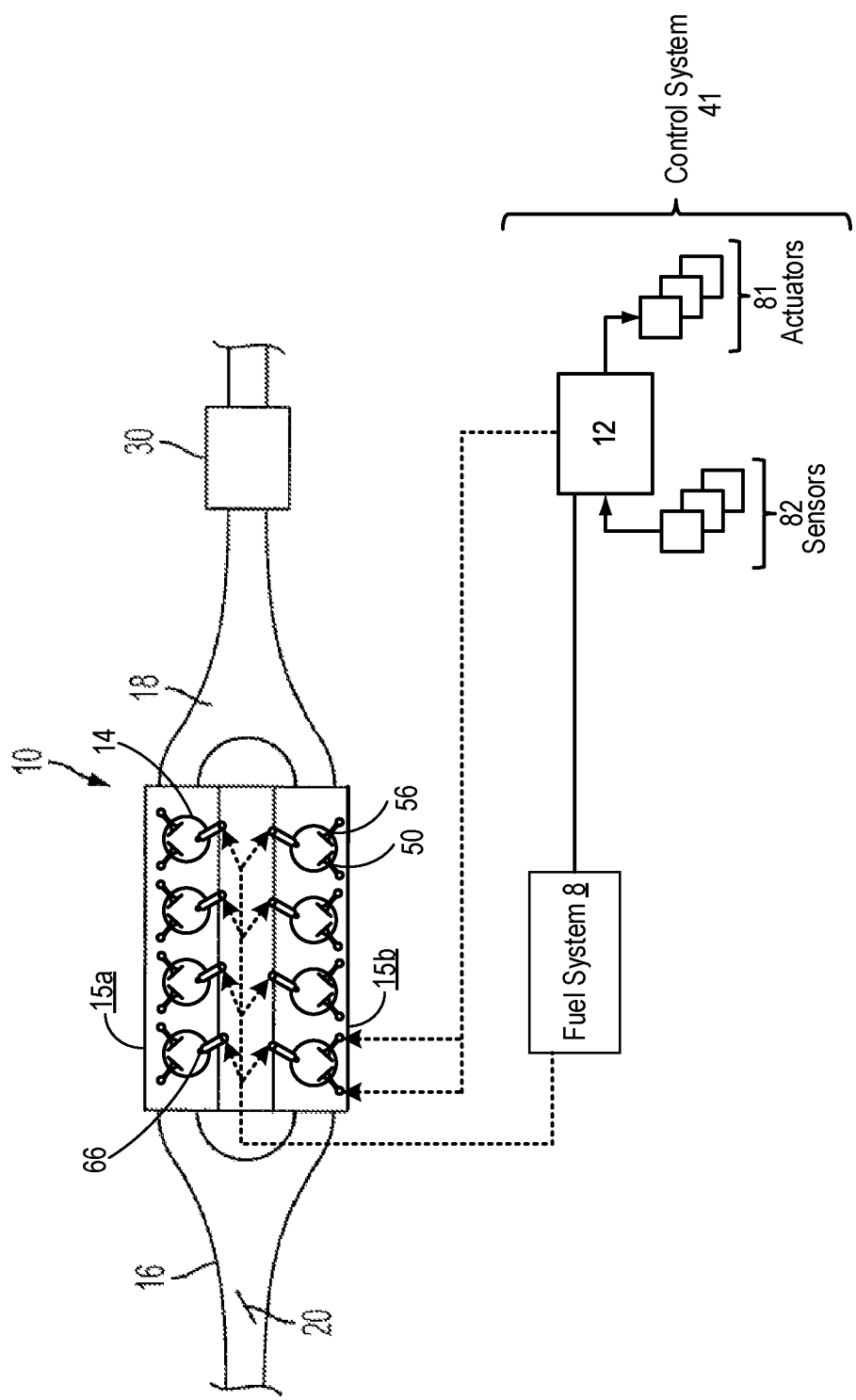
FIG. 1 shows an example embodiment of an engine configured with an individual cylinder deactivation mechanism.

FIG. 1 shows an example engine 10 having a first bank 15a and a second bank 15b. In the depicted example, engine 10 is a V8 engine with the first and second banks each having four cylinders. Engine 10 has an intake manifold 16, throttle 20, and an exhaust manifold 18 coupled to an emission control system 30. Emission control system 30 includes one or more catalysts and air-fuel ratio sensors, such as described with regard to FIG. 2. As one non-limiting example, engine 10 can be included as part of a propulsion system for a passenger vehicle.

Engine 10 may have cylinders 14 with selectively deactivatable intake valves 50 and selectively deactivatable exhaust valves 56. In one example, intake valves 50 and exhaust valves 56 are configured for camshaft actuation (as elaborated in FIG. 2) via individual camshaft-based cylinder valve actuators. Each engine cylinder bank could include one camshaft that actuates the intake and exhaust valves. In an alternate example, each engine cylinder bank could include one camshaft actuating intake valve and a separate camshaft actuating exhaust valve. In alternate examples, the valves may be configured for electric valve actuation (EVA) via electric individual cylinder valve actuators. While the depicted example shows each cylinder having a single intake valve and a single exhaust valve, in alternate examples, each cylinder may have a plurality of selectively deactivatable intake valves and/or a plurality of selectively deactivatable exhaust valves. The engine components actuated during cylinder valve activation/deactivation may be collectively known as VDE mechanisms or VDE actuators.

During selected conditions, such as when the full torque capability of the engine is not desired (such as when engine load is less than a threshold load, or when operator torque demand is less than a threshold demand), one or more cylinders of engine 10 may be selected for selective deactivation (herein also referred to as individual cylinder deactivation). This may include selectively deactivating one or more cylinders on only the first bank 15a, one or more cylinders on only the second bank 15b, or one or more cylinders on each of the first and second bank. The number and identity of cylinders deactivated on each bank may be symmetrical or asymmetrical.

During the deactivation, selected cylinders may be deactivated by closing the individual cylinder valve mechanisms, such as intake valve mechanisms, exhaust valve mechanisms, or a combination of both. Cylinder valves may be selectively deactivated via hydraulically actuated lifters (e.g., lifters coupled to valve pushrods), via a deactivating follower mechanism in which the cam lift following portion of the follower can be decoupled from the valve actuating portion of the follower, or via electrically actuated cylinder valve mechanisms coupled to each cylinder. Herein, the cylinder deactivating mechanisms may be collectively referred to as VDE mechanisms. In some examples, fuel flow to the deactivated cylinders may be stopped, such as by deactivating cylinder fuel injectors 66. In some examples, spark supplied to the deactivated cylinders may also be stopped, such as by disabling a current to a spark circuit.

While the selected cylinders are disabled, the remaining enabled or active cylinders continue to carry out combustion with fuel injectors and cylinder valve mechanisms active and operating. To meet the torque requirements, the engine produces the same amount of torque on the active cylinders. This requires higher manifold pressures, resulting in lowered pumping losses and increased engine efficiency. Also, the lower effective surface area (from the enabled cylinders) exposed to combustion reduces engine heat losses, improving the thermal efficiency of the engine.

The cylinder valve deactivation mechanism (or VDE mechanism) coupled to each of the intake valve and the exhaust valve of a deactivatable cylinder may be opportunistically diagnosed for degradation of the mechanism. In one example, as elaborated at FIG. 3, during an engine-off condition, an engine controller may spin the engine unfueled using a starter motor. While the engine is spinning unfueled, an intake valve and an exhaust valve of a selectively deactivatable cylinder may be actuated and a first exhaust flow rate through an exhaust particulate filter may be measured via a delta pressure sensor coupled across the exhaust particulate filter. Then the intake valve and the exhaust valve of the selectively deactivatable cylinder may be deactivated and a second exhaust flow rate through the exhaust particulate filter may be measured. Responsive to the second exhaust flow rate being within a first threshold range of the first exhaust flow rate, it may be indicated that the at least one of the intake valve and the exhaust valve is stuck in a fully open position when commanded to close. In other words, complete degradation of the valve may be indicated. If the second exhaust flow rate is outside the first threshold range of the first exhaust flow rate but within a second threshold range of the first exhaust flow rate (the second threshold range larger than the first threshold range), it may be indicated that at least one of the intake valve and the exhaust valve is stuck in a partially open position when commanded to close. In other words, partial degradation of the valve may be indicated.

Engine 10 may operate on a plurality of substances, which may be delivered via fuel system 8. Fuel tanks in fuel system 8 may hold fuel with different fuel qualities, such as different fuel compositions. These differences may include different alcohol content, different octane, different heat of vaporizations, different fuel blends, and/or combinations thereof etc. Engine 10 may be controlled at least partially by a control system 41 including controller 12. Controller 12 may receive various signals from sensors 82 coupled to engine 10 (and described with reference to FIG. 2), and send control signals to various actuators 81 coupled to the engine and/or vehicle (as described with reference to FIG. 2). The various sensors may include, for example, various temperature, pressure, and air-fuel ratio sensors.

Figure 2:
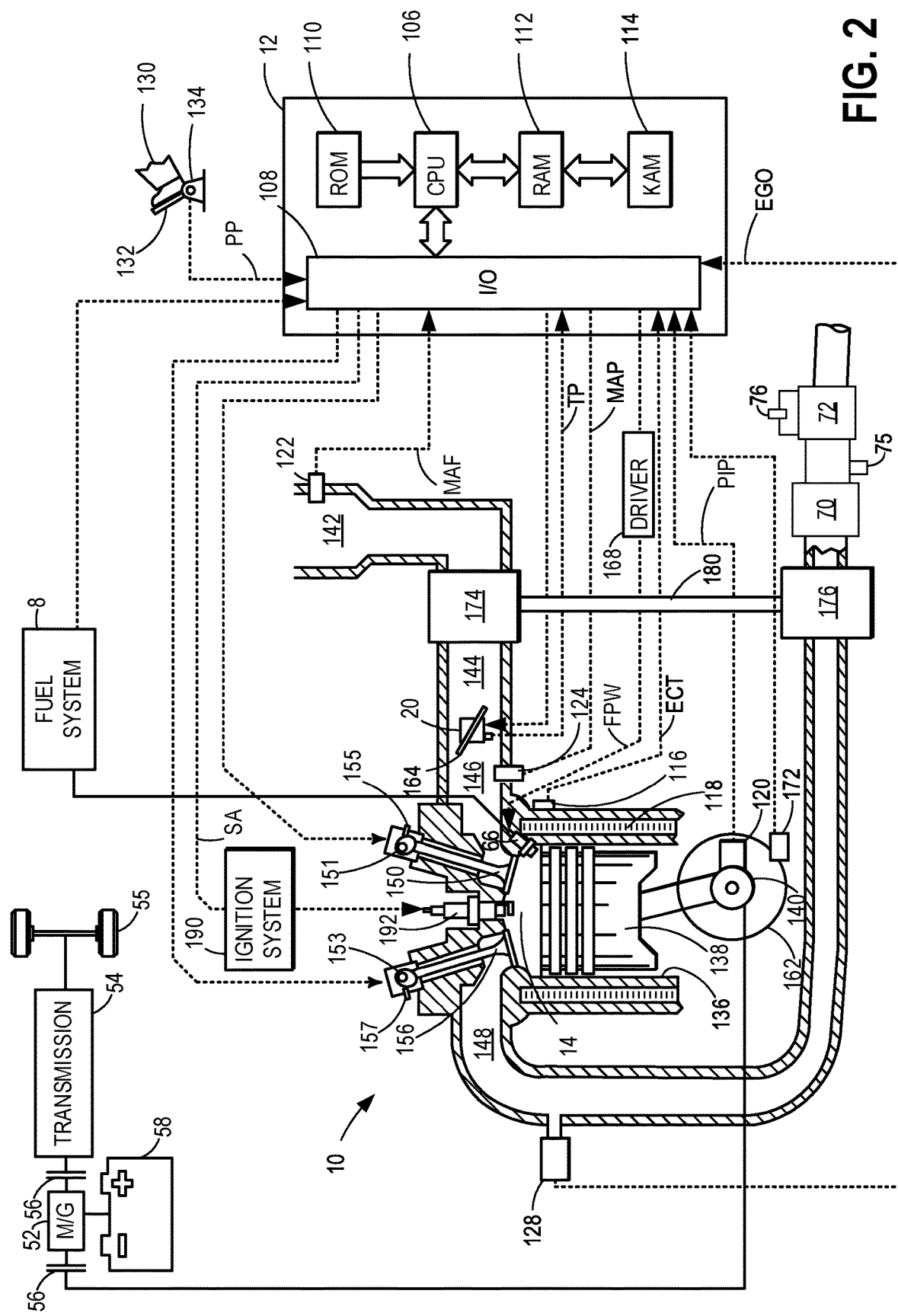
FIG. 2 shows an example variable displacement engine (VDE) system coupled to a hybrid vehicle.

FIG. 2 depicts an example embodiment of a combustion chamber or cylinder of internal combustion engine 10, such as engine 10 of FIG. 1. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to a flywheel 162 and at least one drive wheel of the passenger vehicle via a transmission system. Further, a starter motor 172 may be coupled to crankshaft 140 via flywheel 162 to enable cranking (e.g., spinning) of engine 10, typically used for starting the engine. When starting an engine, after combustion occurs, actuation of the starter is ceased as combustion facilitates spinning of the engine. In one example, starter motor 172 may be a conventional starter motor. In other examples, starter motor 172 may be an integrated starter motor, such as those typically found on hybrid vehicles.

Cylinder 14 may receive intake air via a series of air intake passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a boosting device configured as a turbocharger. Turbocharger includes a compressor 174 arranged between intake passages 142 and 144, and an exhaust turbine 176 arranged along exhaust passage 148. Compressor 174 may be at least partially powered by exhaust turbine 176 via a shaft 180. A charge air cooler (not shown) may be optionally included downstream of compressor 174. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174. Nominal engine operation is considered an ignition-on condition when the engine is operated in response to operator torque demands.

Exhaust passage 148 may receive exhaust gases from other cylinders of engine 10 in addition to cylinder 14. Exhaust passage 148 and intake passage 144 may be fluidically coupled via an EGR tube (not shown) that serves to recirculate exhaust gas from the exhaust passage to the intake passage. Exhaust gas sensor 128 is shown coupled to exhaust passage 148 upstream of emission control device 70. Exhaust gas sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Exhaust temperature may be estimated by temperature sensor 75 located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

An emission control device 70 is shown arranged along the exhaust passage 148 downstream the turbine 176. The device 70 may be a three-way catalyst (TWC), NOx trap, various other emission control devices, or combinations thereof. In some embodiments, during operation of the engine 10, the emission control device 70 may be periodically reset by operating at least one cylinder of the engine within a particular air/fuel ratio.

A particulate filter (PF) 72 is shown arranged along the exhaust passage 48 downstream of the emission control device 70. The particulate filter 72 may be a gasoline particulate filter or a diesel particulate filter. A substrate of the particulate filter 72 may be made of ceramic, silicon, metal, paper, or combinations thereof. During operation of the engine 10, particulate filter 72 may capture exhaust particulate matter (PMs), such as ash and soot (e.g., from unburned hydrocarbons) in order to reduce vehicle emissions. As particulate matter accumulates on the PF 72, the exhaust back pressure may increase which may negatively influence the engine performance. Particulate matter load on the PF may be estimated based on the exhaust backpressure as estimated via a pressure sensor 76 coupled across the PF. The pressure sensor 76 may be a differential (delta) pressure sensor that measures the change in exhaust pressure as exhaust flows through the PF, such as a Delta Pressure Feedback Exhaust (DPFE) sensor. In other examples, the pressure sensor may be an absolute pressure sensor and the controller may measure the pressure change across the PF based on outputs from pressure sensors coupled upstream and downstream of the filter. Once the PF reaches a threshold load, the PF 72 may be periodically or opportunistically regenerated to reduce the particulate matter load and the corresponding exhaust back pressure.

The DPFE sensor monitors gas flow (such as flow rate, amount of flow) through the PF 72. Gas flow through the PF 72 may be exhaust gas flow when the engine is fueled or air flow when the engine is operated unfueled. There may be a change in flow via the PF 72, such as a reduction of flow via the PF upon selective deactivation of one or more engine cylinders (via the VDE mechanism), causing a corresponding change in delta pressure as estimated by the DPFE sensor. However, as an example, if the VDE mechanism is degraded, one or more cylinder valves may remain at least partially open when they are commanded to be closed during the selective deactivation of one or more engine cylinders. Due to the one or more cylinder valves remaining open, there may not be an expected reduction of air flow via the PF upon selective deactivation of one or more engine cylinders, thereby indicating degradation of the VDE mechanism. Each cylinder of engine 10 may include one or more intake valves and one or more exhaust valves. For example, cylinder 14 is shown including at least one poppet-style intake valve 150 and at least one poppet-style exhaust valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 comprise a variable displacement engine (VDE) mechanism and may be used to selectively deactivate (close) one or more of the intake valve 150 and the exhaust valve 156 during cylinder deactivation. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. One or more engine cylinders may be selectively deactivated by closing the individual intake valve mechanisms, the exhaust valve mechanisms, or a combination of both via the cylinder deactivating mechanisms (referred herein as VDE mechanisms).

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines. In one example, during selective deactivation of one or more engine cylinders (via VDE mechanism), spark supplied to the deactivated cylinders may also be stopped, such as by disabling operation of the spark plug 192.

In some embodiments, each cylinder of engine 10 may be configured with one or more fuel injectors for providing fuel thereto. As a non-limiting example, cylinder 14 is shown including one fuel injector 66. Fuel injector 66 is shown coupled directly to cylinder 14 for injecting fuel directly therein in proportion to the pulse width of signal FPW received from controller 12 via electronic driver 168. In this manner, fuel injector 66 provides what is known as direct injection (hereafter also referred to as "DI") of fuel into combustion cylinder 14. While FIG. 2 shows fuel injector 66 as a side injector, it may also be located overhead of the piston, such as near the position of spark plug 192. Such a position may facilitate mixing and combustion when operating the engine with an alcohol-based fuel due to the lower volatility of some alcohol-based fuels. Alternatively, the injector may be located overhead and near the intake valve to facilitate mixing. Fuel may be delivered to fuel injector 66 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, fuel injector 66 may be a port injector providing fuel into the intake port upstream of cylinder 14. In one example, during selective deactivation of one or more engine cylinders (via VDE mechanism), fuel flow to the deactivated cylinders may be stopped, such as by deactivating cylinder fuel injector 66.

It will also be appreciated that while the depicted embodiment illustrates the engine being operated by injecting fuel via a single direct injector, in alternate embodiments, the engine may be operated by using two injectors (for example, a direct injector and a port injector) and varying a relative amount of injection from each injector. As described above, FIG. 2 shows one cylinder of a multi-cylinder engine. As such each cylinder may similarly include its own set of intake/exhaust valves, fuel injector(s), spark plug, etc.

Further, the distribution and/or relative amount of fuel delivered from the injector may vary with operating conditions. In one example, some vehicles may be operated in a deceleration fuel shut-off mode. Specifically, in response to the vehicle operating conditions including a running vehicle coasting (e.g., coasting downhill) with the transmission in gear, the controller may stop fuel delivery to cylinders of the engine (e.g., enter deceleration fuel shut-off (DFSO) mode) to increase fuel economy until an operator torque demand is received or engine operating conditions change such that fuel delivery is resumed. Signals indicating engine speed, pedal position, and throttle position may be used to determine when the controller initiates entering DFSO mode.

Controller 12 is shown as a microcomputer, including microprocessor unit 106, input/output ports 108, an electronic storage medium for executable programs and calibration values shown as read-only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, charge flow through an exhaust passage from delta pressure sensor 76, and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold. The controller 12 receives signals from the various sensors of FIGS. 1-2 and employs the various actuators of FIGS. 1-2 to adjust engine operation based on the received signals and instructions stored on a memory of the controller. In one example, in response to a decrease in engine torque demand, the controller 12 may send a signal to the actuation systems 151 and 153 (VDE mechanism) to selectively deactivate intake valves 150 and exhaust valves 156 coupled to one or more deactivatable engine cylinders. In another example, in response to entry conditions for carrying out a VDE mechanism diagnostic being met, the controller 12 may crank the engine unfueled via the starter motor 172 and then selectively deactivate the intake and/or the exhaust valves via the Cam actuation systems 151 and 153. Details of VDE system diagnostics are elaborated with reference to FIGS. 3-4.

Non-transitory storage medium read-only memory chip 110 can be programmed with computer readable data representing instructions executable by microprocessor unit 106 for performing the methods described below as well as other variants that are anticipated but not specifically listed.

In some examples, vehicle 101 may be a hybrid vehicle with multiple sources of torque available to one or more vehicle wheels 55. In other examples, vehicle 101 is a conventional vehicle with only an engine, or an electric vehicle with only electric machine(s). In the example shown, vehicle 101 includes engine 10 and an electric machine 52. Electric machine 52 may be a motor or a motor/generator. Crankshaft 40 of engine 10 and electric machine 52 are connected via a transmission 54 to vehicle wheels 55 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge traction battery 58, for example during a braking operation. In one example, battery 58 may supply power to a hydraulic system and/or an electric motor for operation of the lifting mechanism. In another example, a separate on-board battery (different from traction battery 58), charged using engine power may supply power to a hydraulic system and/or an electric motor for operation of the lifting mechanism.

In this way, the systems of FIGS. 1 and 2 enable a vehicle system comprising: a vehicle, an engine with a deactivatable cylinder and a non-deactivatable cylinder, a starter motor, each of an intake valve and an exhaust valve coupled to the deactivatable cylinder, each of the intake valve and exhaust valve selectively actuatable via a variable displacement engine (VDE) actuator, one or more fuel injectors coupled to each of the deactivatable cylinder and the non-deactivatable cylinder, an engine intake including an intake throttle, an engine exhaust including a particulate filter coupled to an exhaust passage, and a delta pressure sensor coupled across the particulate filter. The system may further include a controller with computer readable instructions stored on non-transitory memory for: rotating each of the deactivatable cylinder and the non-deactivatable cylinder unfueled, estimating a first exhaust pressure across the particulate filter via the delta pressure sensor during the rotating, then deactivating each of the intake valve and the exhaust valve of the deactivatable cylinder via the VDE actuator, estimating a second exhaust pressure across the particulate filter via the delta pressure sensor after the deactivating; and in response to a lower than threshold difference between the second exhaust pressure and the first exhaust pressure, indicating degradation of the VDE actuator.

Figure 3:
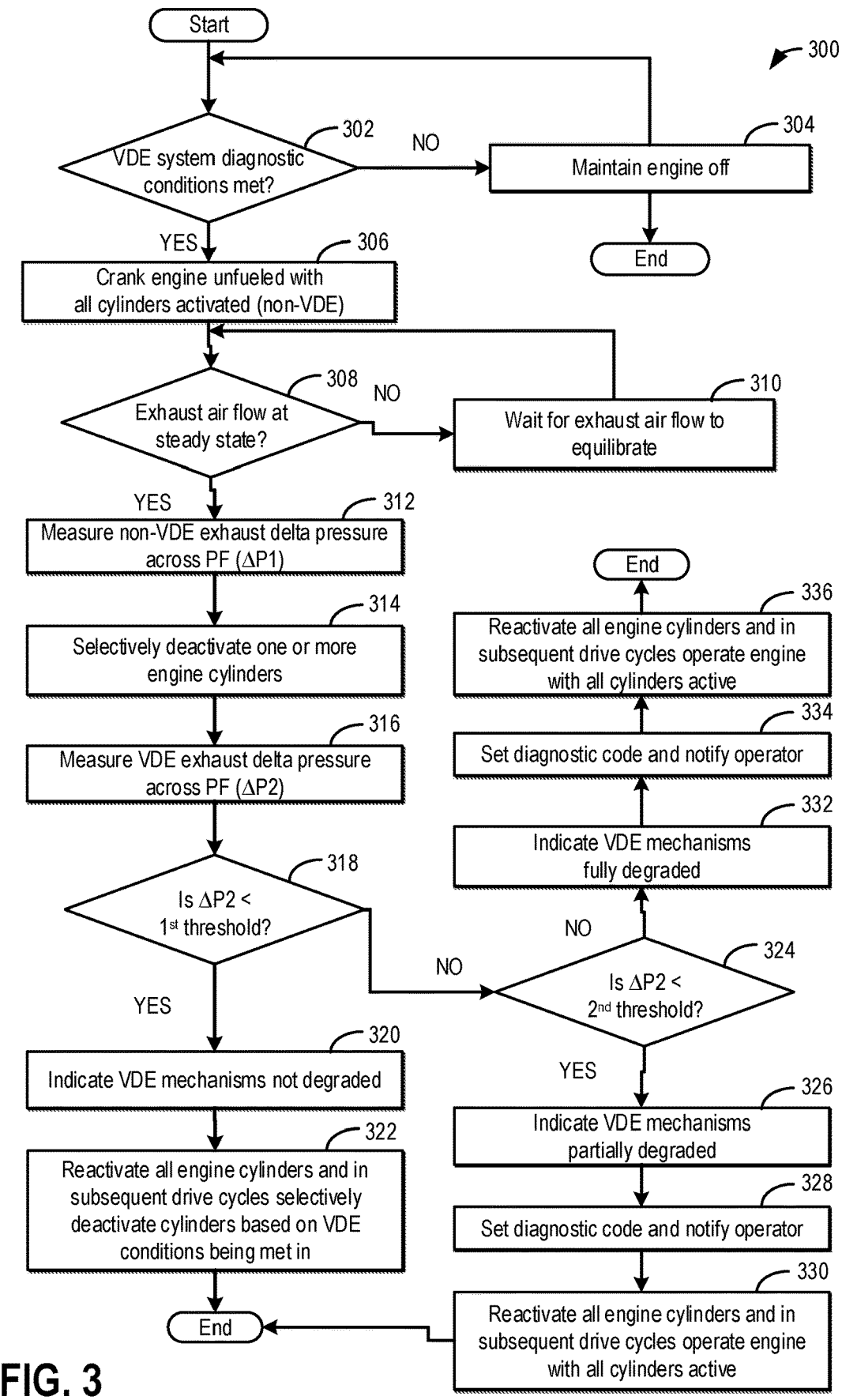
FIG. 3 shows a flow chart illustrating an example method that can be implemented to carry out VDE system diagnostics during an ignition-off, fuel-off condition.

FIG. 3 shows an example method 300 for carrying out variable displacement engine (VDE) system diagnostics for an engine (such as engine 10 shown in FIG. 1) during an ignition-off, fuel-off condition. Therein, degradation of the mechanisms that actuate the deactivatable cylinder valves (such as VDE mechanisms as discussed in relation to FIG. 1) may be diagnosed when the engine is cranked unfueled, based on signals from an exhaust delta pressure sensor (such as sensor 76 in FIG. 2) which monitors a change in gas flow rate through the exhaust passage (exhaust pressure) across an exhaust particulate filter. Instructions for carrying out method 300 and the rest of the methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 302, the routine includes determining whether VDE system diagnostic conditions have been met. One example of a VDE system diagnostic condition is a fuel-off condition for a passenger vehicle or automated vehicle (AV). A fuel-off condition is when fuel is not being delivered to any of the cylinders of the engine. This fuel-off condition is distinct from operating the engine in VDE mode (e.g., with at least one cylinder deactivated, where the deactivated cylinder may not receive fuel), as during VDE mode at least some cylinders are receiving fuel. A fuel-off condition may include an ignition-on request (e.g., receiving an operator request to turn the engine on when the engine is off). Therein, the ignition-on request may include an operator turning a key in the vehicle ignition, or a remote start condition where an operator remotely requests to start the vehicle using a key fob or other mobile device. In response to the request to start the engine (e.g., ignition-on request), the controller may elect to initiate the VDE system diagnostic prior to, or immediately preceeding, starting the engine.

In another example, a fuel-off condition may include an ignition-off request (e.g., receiving an operator request to turn the engine off when the engine is on). Additionally, the fuel-off condition may include a controller wake-up function, which may occur after an ignition-off request, such as several hours after an ignition-off request. During a controller wake-up function, when a specified time duration has elapsed after the ignition-off request, the controller may wake-up. Specifically, the controller may be shifted from a sleep mode to a wake-up mode. In a non-limiting example, a vehicle engine is turned off by the operator at 4:00 p.m., and the controller estimates that 4 hours may be required for engine conditions to be optimal for performing the VDE system diagnostic routine. The controller will then wake up at 8:00 pm to carry out the VDE system diagnostic routine. Performing the VDE system diagnostic routine during a fuel-off condition that also includes an ignition-off condition has several advantages. In one example, the operator is unlikely to be in the vehicle during that time, presenting a non-occupant vehicle condition. Performing the diagnostic routine during a non-occupant vehicle condition reduces inconvenience or concern to the operator as a result of the engine cranking without start (e.g., combustion) associated with the VDE system diagnostic routine and described herein.

Additional VDE system diagnostic conditions at 302 may include determining whether a threshold duration has elapsed since completion of a previous iteration of the VDE system diagnostic routine. In one example, it may not be efficient to run the VDE system diagnostic routine in response to all fuel-off, ignition-off events, and instead may be initiated after a threshold time duration (e.g., after 5 days) or after a threshold number of fuel-off, ignition-off conditions (e.g., after ten fuel-off, ignition-off conditions). In another example, the VDE system diagnostic routine may be initiated after a duration measured by a threshold number of fuel tank fill-ups, a threshold number of vehicle miles traveled, or other sensor input. If the threshold duration has not been met, then the routine may maintain engine off conditions and return (e.g., continually monitors whether VDE conditions have been met).

Another example of a VDE system diagnostic condition at 302 may include determining whether a battery or other power source coupled to the engine is charged sufficiently to ensure availability of adequate power to actuate the starter motor for the duration of the VDE system diagnostic routine and to subsequently start the engine in response to an operator request. Because the battery is typically recharged when the engine is on, and the engine is off during the VDE system diagnostic routine, execution of the VDE system diagnostic routine may draw down battery charge to actuate the starter motor. If the battery is inadequately charged when the VDE system diagnostic routine is performed, it is possible that insufficient charge will be available for cranking of the engine and subsequent starting of the vehicle in response to an operator request. In one example, if the battery charge is lower than a specified threshold, then the VDE system diagnostic routine may return to monitor for VDE conditions being met before initiating the diagnostic routine rather than proceeding with the diagnostic routine and draining the battery. Alternatively, if the battery charge is above the specified threshold, then the VDE system diagnostic routine may be executed.

If VDE diagnostic conditions are not met, then at 304, the method includes maintaining the engine off. In the example of a vehicle equipped with a controller wake-up function, the controller would not be actuated to wake up to initiate the VDE system diagnostic routine.

If VDE diagnostic conditions are met, then at 306, the method includes cranking (e.g., spinning) the engine unfueled with all cylinders activated. In one example, the engine may be cranked with a starter motor (such as starter motor 172 shown in FIG. 2) in order to flow air through the cylinders (such as cylinder 14 of FIG. 2) and the exhaust passage (such as exhaust passage 148 of FIG. 2). Specifically, the engine is off when the starter motor is actuated to spin the engine. In one example, if the vehicle is a hybrid vehicle, the engine may be cranked using an integrated starter motor. In other examples, the engine may be cranked using a conventional starter motor. In one example, the controller may actuate the starter motor to spin at a constant rotational speed in order to provide consistent engine conditions for observing a potential change in air flow through the exhaust passage, as described herein. As such, the engine may be cranked at a lower than threshold engine speed, the threshold engine speed based on an engine idling speed. In one example, the starter motor may crank the engine at a constant 700 rpm for the duration of the VDE system diagnostic routine. In other examples, engine cranking speed may vary directly with battery voltage, as the starter motor may actuate at a speed dependent on battery voltage. As a result, temperature and battery charge levels may dictate engine cranking speed. In this way, rotating each of the deactivatable cylinder and the non-deactivatable cylinder unfueled includes, during an engine-off condition, in absence of a vehicle occupant, waking up the controller and actuating the starter motor to crank each of the deactivatable cylinder and the non-deactivatable cylinder while maintaining the fuel injectors deactivated.

It will be appreciated that at 306 all cylinder valves of every engine cylinder are active, including those that are capable of being deactivated. Active cylinder valves includes the intake and exhaust valves functioning as they would during nominal engine operation (non-VDE mode) meaning that an intake valve coupled to a cylinder will be open during the intake stroke for that cylinder, and an exhaust valve coupled to a cylinder will be open during the exhaust stroke for that cylinder. Conversely, a deactivated cylinder includes deactivating at least one cylinder valve mechanism coupled to the cylinder valves of the cylinder. Deactivated cylinder valves include an intake valve coupled to a cylinder being closed during the intake stroke for that cylinder, and an exhaust valve coupled to a cylinder being closed during the exhaust stroke for that cylinder. Further, the fuel injectors (such as fuel injector 66 of FIGS. 1-2) coupled to each of the cylinders are selectively controlled not to deliver fuel to the cylinders. The ignition system (such as ignition system 190 of FIG. 2) may also be selectively controlled not to deliver spark via the spark plugs coupled to each cylinder. In this way, the engine may spin at a relatively low, constant speed without combustion as fuel and/or spark may not be delivered to the cylinders.

Further, during spinning the engine unfueled, the throttle may be maintained in a fully open position to enable a higher amount of air to flow via the cylinders into the exhaust passage. In one example, the controller may send a signal to selectively actuate a throttle plate (such as throttle plate 164 of throttle 20 of FIG. 2) to increase the opening of the throttle plate in order to increase the flow of intake air entering the intake passage (such as intake passage 144 of FIG. 1).

At 308, the routine includes determining whether the exhaust air flow rate has reached a steady state (e.g., equilibrium). It may be determined that the exhaust air flow rate has reached a steady state when the rate of change of the exhaust air flow rate is lower than a threshold rate. Cranking the engine from a stopped condition during a fuel-off, ignition-off condition may begin with a transient air flow via the cylinder and the exhaust passage. In one example, exhaust flow may reach equilibrium after a specified time count has been reached. Therein, the specified time count may be based on mapped data, or based upon deviations in sensor data being less than a specified threshold. In this way, the initial transient start-up pressure and flow conditions of the intake manifold and engine may reach steady state so that exhaust air flow measurements may be taken under consistent conditions. In one example, the specified time count may be 3-5 seconds before flow conditions reach equilibrium. If the exhaust air flow has not reached equilibrium, such as when the exhaust air flow continues to increase rapidly, then at 310, the routine includes waiting for the exhaust air flow to equilibrate.

If air flow through the engine has reached steady state, then at 312, the routine includes measuring a non-VDE exhaust delta pressure ($\Delta P1$, also referred to herein as the reference exhaust delta pressure) via the delta pressure sensor coupled across the exhaust particulate filter. The delta pressure across the exhaust particulate filter is directly proportional to the exhaust air flow rate through the exhaust passage and via the particulate filter. The non-VDE exhaust delta pressure measurement may be carried out when the engine is being cranked without fuel delivery to the cylinders, and when all cylinders are active (e.g., when all cylinder intake valves and all cylinder exhaust valves are open for intake strokes and exhaust strokes, respectively). This is then used as the reference value. In one example, the controller may determine a reference exhaust air flow rate during engine spinning with all cylinders activated (non-VDE) based on the measured exhaust delta pressure ($\Delta P1$). For example, the controller may determine the reference exhaust air flow based on a calculation using a look-up table or algorithm with the input being $\Delta P1$ and the output being the reference exhaust air flow.

At 314, the routine includes selectively deactivating one or more engine cylinders (entering VDE mode). In one example, the selective deactivation of the cylinders may be carried out within a threshold duration of time after the measurement of the non-VDE exhaust delta pressure ($\Delta P1$) prior to the immediately next engine fueling event. In another example, the selective deactivation of the cylinders may be carried out within a threshold number of engine cycles after the measurement of the non-VDE exhaust delta pressure ($\Delta P1$) prior to the immediately next engine fueling event. The threshold duration and the threshold number of engine cycles may be based on prior calibrations and sample testing carried out prior to vehicle delivery to the operator. Selective deactivation of the cylinders was described previously, and as such will not be repeated here. During the VDE system diagnostic routine, fuel may not be supplied to any of the engine cylinders, and so selective deactivation in the context of the diagnostic routine refers specifically to deactivating cylinders via deactivation of intake valves and exhaust valves coupled to a deactivatable cylinder. In one example, selective deactivation of the cylinders include concurrently deactivating the one or more cylinder valves of each deactivatable cylinder of the engine, the deactivating further including actuating a solenoid coupled to a camshaft to close the one or more cylinder valves of each deactivatable cylinder. In other examples, a subset of the deactivatable cylinders may be deactivated. In alternate embodiments, each engine cylinder may be deactivated independently and singularly. Specifically, an eight-cylinder engine may operate in seven-cylinder mode, six-cylinder mode, five-cylinder-mode, or four-cylinder mode, for example. If the engine is configured to deactivate individual cylinders in this way, then deactivation of a single cylinder as part of the VDE system diagnostic routine may allow for the VDE mechanisms coupled to individual cylinders to be assessed for degradation. Additionally, it may be possible for the VDE system diagnostic routine to deactivate a different permutation of deactivatable cylinders each time the diagnostic is performed, or the controller may selectively deactivate different combinations of cylinders as part of a single diagnostic in response to receiving exhaust air flow measurements that fall outside a specified threshold. By changing which cylinders are deactivated, it may be possible to distinguish specifically which cylinder(s) may have degraded valve functionality.

At 316, the routine includes measuring a VDE exhaust delta pressure ($\Delta P2$) via the delta pressure sensor coupled across the exhaust particulate filter. The delta pressure across the exhaust particulate filter is directly proportional to the exhaust air flow rate via the particulate filter. The VDE exhaust delta pressure measurement may be carried out immediately after the selective deactivation of the deactivatable cylinders. In one example, the VDE exhaust delta pressure measurement may be carried out within a threshold duration of time after the selective deactivation of the engine cylinders. In another example, VDE exhaust delta pressure measurement may be carried out within a threshold number of engine cycles after the selective deactivation of the engine cylinders. The threshold duration and the threshold number of engine cycles may be based on prior calibrations and sample testing carried out prior to vehicle delivery to the operator. In one example, the controller may determine an exhaust air flow amount immediately following the selective deactivation based on the measured exhaust delta pressure ($\Delta P2$). For example, the controller may determine the exhaust air flow based on a calculation using a look-up table or algorithm with the input being $\Delta P2$ and the output being the exhaust air flow. As such, after cylinder deactivation, the exhaust air flow may decrease due to lack of air flow via the deactivated cylinders. Therefore, exhaust delta pressure ($\Delta P2$) measured after the deactivation may be lower than the reference exhaust delta pressure ($\Delta P1$).

At 318, the routine includes determining if the measured exhaust delta pressure ($\Delta P2$) immediately following the selective deactivation of the engine cylinders is lower than a first threshold pressure. The first threshold pressure may be a non-zero positive threshold based on the reference exhaust delta pressure ($\Delta P1$) and the number of cylinders deactivated during the selective deactivation of the deactivatable cylinders. For example, the controller may determine the first threshold pressure based on a calculation using a look-up table or algorithm with the inputs being each of $\Delta P1$ and the number of cylinders that has been deactivated and the output being the first threshold pressure. Also, the first threshold may be based on mapped data for a specified operating condition. Alternatively, the routine may include determining if the exhaust air flow amount following the selective deactivation of the cylinders is lower than a first threshold air flow amount. The first threshold air flow amount may be based on the reference exhaust air flow amount and the number of cylinders deactivated during the selective deactivation of the deactivatable cylinders. For example, the controller may determine the first threshold air flow amount based on a calculation using a look-up table or algorithm with the inputs being each of the reference exhaust air flow amount and the number of cylinders that has been deactivated and the output being the first threshold air flow amount.

If it is determined that $\Delta P2$ is lower than the first threshold or if the exhaust air flow amount following the selective deactivation of the cylinders is lower than the first threshold air flow amount, at 320, it may be inferred and indicated that the mechanisms that actuate the deactivatable cylinder valves (VDE mechanism) is not degraded. At 322, upon completion of the VDE mechanism diagnostic routine, all engine cylinders may be reactivated prior to the immediately next engine restart. Since the VDE mechanism is not degraded, during subsequent drive cycles, the deactivatable engine cylinders may be selectively deactivated via the VDE mechanism upon VDE conditions being met. The VDE conditions may include specific engine speed/load windows, as well as various other operating conditions including engine temperature during which engine operation with a reduced number of combusting cylinders may provide optimal engine output.

If it is determined that ΔP2 is higher than the first threshold pressure or if the exhaust air flow amount following the selective deactivation of the cylinders is higher than the first threshold air flow amount, at 324, the routine includes determining if the measured exhaust delta pressure (ΔP2) immediately following the selective deactivation of the engine cylinders is lower than a second threshold pressure. As an example, the second threshold pressure, a non-zero positive threshold, may correspond the reference exhaust delta pressure (ΔP1) and may be independent of the number of cylinders deactivated during the selective deactivation of the deactivatable cylinders.

In one example, the first threshold range and the second threshold range may be based on calibration and/or standard testing procedures carried out in the pre-delivery phase of the vehicle using one or more engine systems fitted with one of a completely degraded VDE mechanism, a partially degraded VDE mechanism, and a non-degraded VDE mechanism. In another example, an exhaust flow model may be used to estimate each of the first threshold range and the second threshold range.

Alternatively, the routine may include determining if the exhaust air flow amount following the selective deactivation of the cylinders is lower than a second threshold air flow amount. In one example, the second threshold air flow may be the reference exhaust air flow amount.

If it is determined that ΔP2 is higher than each of the first threshold pressure and the second threshold pressure or that the exhaust air flow amount following the selective deactivation of the cylinders is higher than each of the first threshold air flow amount and the second threshold air flow amount, at 332, it may be inferred and indicated that the VDE mechanism is completely degraded. In one example, indicating complete degradation of the VDE mechanism includes indicating that the one or more cylinder valves of the deactivatable cylinders are stuck in a completely open position when they are commanded to be closed.

In one example, in order to identify specific cylinder valves that are stuck in a completely open position, after measuring ΔP1, the deactivatable cylinders may be deactivated one by one, and after deactivation of each cylinder, ΔP2 may be measured and compared to each of the first threshold pressure and the second threshold pressure. If it is determined that after deactivation of a specific cylinder, ΔP2 remains higher than each of the first threshold pressure and the second threshold pressure, it may be inferred that one or more cylinder valves coupled to the specific cylinder has degraded and is stuck in an open position even when it is commanded to be closed during valve deactivation.

At 334, a diagnostic code (flag) may be set to notify the operator regarding complete degradation of the VDE mechanism. At 336, upon completion of the VDE mechanism diagnostic routine, all engine cylinders may be reactivated prior to the immediately next engine restart. Since the VDE mechanism is degraded, during subsequent drive cycles, the engine may be operated with all cylinders active even during conditions when selective deactivation of engine cylinders may be desired. In one example, if it is determined which (specific) cylinders valves are degraded, upon conditions for selective engine cylinder deactivation being met, the specific cylinder with the degraded VDE mechanism may be maintained in an active state while other deactivatable cylinders may be selectively deactivated.

Returning to 324, if it is determined that ΔP2 is higher than the first threshold pressure but lower than the second threshold pressure or that the exhaust air flow following the selective deactivation of the cylinders is higher than the first threshold air flow amount but lower than the second threshold air flow amount, at 326 it may be inferred and indicated that the VDE mechanism is partially degraded. In one example, partial degradation of the VDE mechanism includes the one or more cylinder valves of the deactivatable cylinders being stuck in a partially open position when they are commanded to be closed causing a leak in the one or more cylinder valves.

It will be appreciated that it may be possible to perform crank shaft angle-based sampling of the exhaust airflow in order to distinguish intake valve degradation from exhaust valve degradation. In one example, if the exhaust valves of a cylinder are deactivated but the intake valves are working nominally (as in non-VDE mode), it is possible that the exhaust air flow may not be perceptibly impacted. As a result, additional sensor data may be used to aid in distinguishing intake valve from exhaust valve degradation. In one example, a manifold pressure (MAP) sensor may be used, such as the MAP sensor 124 of FIG. 2, in order to observe a decrease in the intake manifold pressure at the time of intake valve opening (the intake stroke). In another example, if the intake valves of a cylinder are deactivated but the exhaust valves are working nominally (as in non-VDE mode) there may be a decrease in the exhaust air flow at the time of exhaust valve opening (the exhaust stroke). By monitoring the intake and exhaust flow characteristics in this way, temporary deviations from nominal intake and exhaust flow may help more accurately diagnose partial VDE cylinder valve degradation.

In one example, in order to identify specific cylinder valves that are stuck in a partially open position, after measuring ΔP1, the deactivatable cylinders may be deactivated one by one, and after deactivation of each cylinder, ΔP2 may be measured and compared to each of the first threshold pressure and the second threshold pressure. If it is determined that after deactivation of a specific cylinder, ΔP2 remains higher than the first threshold pressure but reduces to below the second threshold pressure, it may be inferred that one or more cylinder valves coupled to the specific cylinder is leaking and is stuck in the partially open position even when it is commanded to be completely closed during valve deactivation.

At 326, a diagnostic code (flag) may be set to notify the operator regarding partial degradation of the VDE mechanism. At 330, upon completion of the VDE mechanism diagnostic routine, all engine cylinders may be reactivated prior to the immediately next engine restart. Since the VDE mechanism is partially degraded, during subsequent drive cycles, the engine may be operated with all cylinders active even during conditions when selective deactivation of engine cylinders may be desired. In one example, if it is determined which (specific) cylinders valves are leaking, upon conditions for selective engine cylinder deactivation being met, the specific cylinder with the leaking cylinder valves may be maintained in an active state while other deactivatable cylinders may be selectively deactivated.

Figure 4:
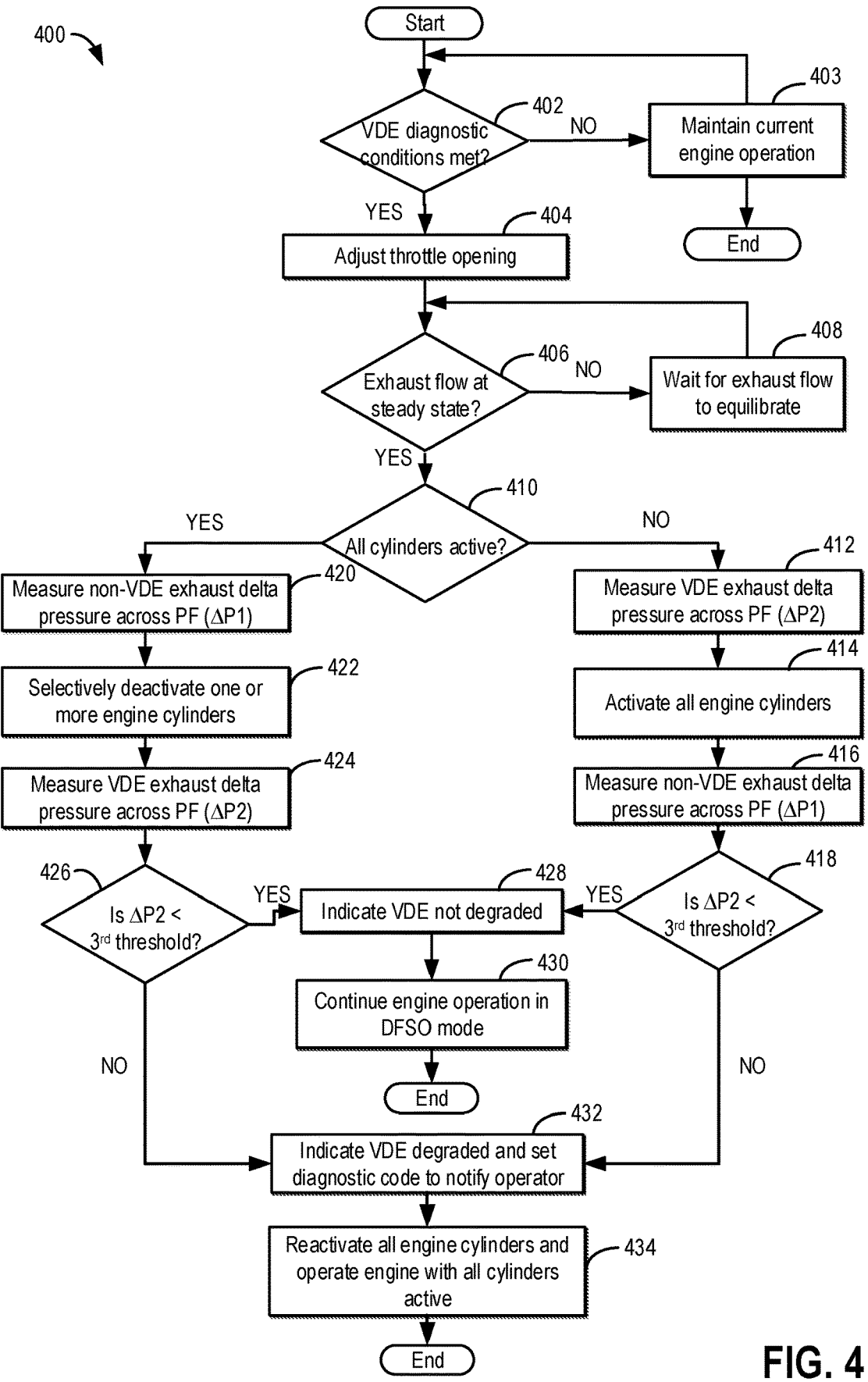
FIG. 4 shows a flow chart illustrating an example method that can be implemented to carry out VDE system diagnostics during a deceleration fuel shut-off (DFSO) condition.

FIG. 4 shows an example routine 400 for performing a variable displacement engine (VDE) system diagnostic for an engine (such as engine 10 shown in FIG. 1) in response to the engine operating in deceleration fuel shut-off (DFSO) mode. Therein, degradation of the VDE mechanism may be diagnosed when the engine is operated unfueled, based on signals from a delta pressure sensor (coupled across an exhaust particulate filter) which monitors a change in exhaust air flow pressure across the particulate filter. As previously stated, it will be appreciated that other methods for measuring the exhaust air flow may be used.

At 402, the routine includes determining whether VDE system diagnostic conditions have been met. One example of a VDE system diagnostic condition is the engine being operated in the fuel-off, ignition-on condition of deceleration fuel shut-off (DFSO) mode. In one example, DFSO is a feature where, in response the controller detecting whether the vehicle is coasting (e.g., coasting downhill), the controller stops delivery of fuel to the engine while the transmission is in gear and the vehicle is being propelled via gravity or vehicle momentum. As discussed previously, a fuel-off condition is when fuel is not being delivered to any of the cylinders of the engine.

In vehicle embodiments that include vehicle-to-everything (e.g., V2X) technology, the vehicle controller may communicate with nearby traffic systems and/or with other vehicles. For these embodiments, an additional VDE system diagnostic condition may include previewing the probable duration of the vehicle's current DFSO mode based on parameters such as traffic conditions and road topography. In one example, if the anticipated duration of operating the engine in DFSO mode is below a threshold, the VDE system diagnostic routine may not be initiated. In this way, initiating the VDE system diagnostic routine only to immediately abort it in response to the engine exiting DFSO mode may be avoided.

Additional VDE system diagnostic conditions at 402 may include a threshold duration having elapsed since completion of the previous VDE system diagnostic routine. In one example, it may not be efficient to run the VDE system diagnostic routine in response to all DFSO events, and instead may be initiated after a threshold time duration (e.g., after 5 days) or after a threshold number of DFSO events (e.g., after ten DFSO events). In another example, the VDE system diagnostic routine may be initiated after a duration measured by a threshold number of fuel tank fill-ups, a threshold number of vehicle miles traveled, or other sensor input.

If VDE diagnostic conditions are not met, then at 403, the method includes maintaining current engine operation. In some examples, maintaining current engine operation may include one or more of continuing to adjust the opening of an engine throttle to meet operator torque demand.

At 404, the routine includes adjusting throttle opening. During spinning the engine unfueled, the throttle may be maintained in a fully open position to enable a higher amount of air to flow via the cylinders and the exhaust passage. In one example, the controller may send a signal to selectively actuate a throttle plate (such as throttle plate 164 of throttle 20 of FIG. 2) to increase the opening of the throttle plate in order to increase the flow of intake air entering the intake passage (such as intake passage 144 of FIG. 1).

At 406, the routine includes determining whether the exhaust air flow (rate) has reached a steady state (e.g., equilibrium). Because the vehicle is being propelled during DFSO mode, a plurality of engine operating conditions may be monitored in order to determine whether exhaust air flow has equilibrated. As such, during a vehicle coasting condition, the engine may be spinning at a varying speed, and intake manifold pressure and engine intake and exhaust flow rates may also vary. In one example, the controller may additionally include measurements of mass air flow and engine speed to determine whether exhaust air flow has reached equilibrium. In order to obtain comparable exhaust air flow measurements, fixed engine operating conditions are desired. In one example, when performing the VDE system diagnostic during DFSO mode, the controller may fix the camshaft timing, throttle, and EGR valve positions for the duration of the VDE system diagnostic routine in order to obtain consistent conditions for measuring exhaust air flow in the non-VDE and VDE modes. If the exhaust air flow has not reached equilibrium, as indicated by a plurality of sensors, then at 408, the routine includes waiting for the exhaust flow to equilibrate.

If it is determined that the exhaust air flow rate has equilibrated, at 410, the routine includes determining whether all cylinders are active. Because the operating conditions associated with operating an engine in DFSO are similar to the operating conditions associated with operating in VDE mode (at least one cylinder deactivated), it is possible that the engine may operate in DFSO mode at the same time it is operating in VDE mode. In some examples, the engine may be operating in VDE mode (e.g., with at least one engine cylinder valve mechanism deactivated) in response to suitable engine operating conditions (such as lower engine load, higher engine temperature) when the operator directs the vehicle down a long hill and reduces (e.g., stops) actuation of the accelerator pedal, causing the vehicle to coast down the hill while in gear. In response to the vehicle coasting down a hill, the controller may send a signal to the engine to enter DFSO mode, thereby stopping fuel delivery to the remaining active cylinders. In one example, if the engine is operating in DFSO mode and VDE mode concurrently, then cylinder deactivation may include one or more of deactivation of the VDE mechanisms, limiting (e.g., stopping) fuel delivery, and limiting (e.g., stopping) spark delivery to the deactivated cylinders.

At 416, the routine includes measuring a VDE exhaust delta pressure ($\Delta P2$) via the delta pressure sensor coupled across the exhaust particulate filter. Depending on the number of cylinders deactivated, a corresponding exhaust delta pressure may be generated by the delta pressure sensor. In one example, if two of the four deactivatable cylinders are deactivated during the VDE system diagnostic routine, this may generate a different VDE exhaust delta pressure signal than the VDE exhaust delta pressure signal that would be generated if all four of the deactivatable cylinders are deactivated. In one example, the controller may determine an exhaust air flow amount during cylinder deactivation based on the measured exhaust delta pressure ($\Delta P2$). For example, the controller may determine the exhaust air flow amount based on a calculation using a look-up table or algorithm with the input being $\Delta P2$ and the output being the exhaust air flow amount.

At 414, the routine includes activating all engine cylinders. Specifically, any deactivated engine cylinders are reactivated. Because the engine is being operated in DFSO mode, reactivation of engine cylinders includes activating the cylinder valve mechanisms (e.g., VDE mechanisms), but reactivation does not include reintroducing fuel and/or spark to the deactivated cylinders. Specifically, the engine operates unfueled with all cylinders valves active.

At 416, the routine includes measuring a non-VDE exhaust delta pressure ($\Delta P1$, also referred herein as the reference exhaust delta pressure) via the delta pressure sensor coupled across the exhaust particulate filter. In one example, the non-VDE exhaust delta pressure measurement may be carried out within a threshold duration after the activation of the engine cylinders. In another example, non-VDE exhaust delta pressure measurement may be carried out within a threshold number of engine cycles after the activation of the engine cylinders. The threshold duration and the threshold number of engine cycles may be based on prior calibrations and sample testing carried out prior to vehicle delivery to the operator. In one example, the controller may determine an exhaust air flow amount immediately following the cylinder activation based on the measured exhaust delta pressure ($\Delta$P1). For example, the controller may determine the exhaust air flow amount based on a calculation using a look-up table or algorithm with the input being $\Delta$P1 and the output being the exhaust air flow. As such, after cylinder activation, the exhaust air flow may increase due to increased air flow via the activated cylinders. Therefore, exhaust delta pressure ($\Delta$P2) measured before the activation may be lower than the reference exhaust delta pressure ($\Delta$P1).

At 418, the routine includes determining if the measured exhaust delta pressure ($\Delta$P2) prior to the activation of the engine cylinders is lower than a third threshold pressure. The third threshold pressure may be based on the reference exhaust delta pressure ($\Delta$P1) and the number of cylinders activated during cylinder activation. For example, the controller may determine the third threshold pressure based on a calculation using a look-up table or algorithm with the inputs being each of $\Delta$P1 and the number of cylinders that has been activated and the output being the third threshold pressure. Also, the third threshold may be based on mapped data for a specified operating condition. In one example, the third threshold pressure may be the first threshold pressure (as defined in step 318 in FIG. 3). Alternatively, the routine may include determining if the exhaust air flow amount prior to the activation of the cylinders is lower than a third threshold air flow amount. The third threshold air flow amount may be based on the reference exhaust air flow amount and the number of cylinders activated during the activation of the deactivatable cylinders. For example, the controller may determine the third threshold air flow amount based on a calculation using a look-up table or algorithm with the inputs being each of the reference exhaust air flow amount and the number of cylinders that are activated and the output being the third threshold air flow amount. The third threshold may be different from each of the first threshold and the second threshold used in FIG. 3. In another example, the third threshold may be substantially equal to the first threshold used in FIG. 3.

If it is determined that $\Delta$P2 is lower than the third threshold or if the exhaust air flow amount prior to the activation of the cylinders is lower than the third threshold air flow amount, at 428, no VDE degradation (e.g., VDE mechanism degradation) is indicated, and at 430 the engine may continue operation in DFSO mode before the routine ends. If, at 418, it is determined that $\Delta$P2 is higher than the third threshold or if the exhaust air flow amount prior to the activation of the cylinders is higher than the third threshold air flow amount, then VDE degradation is indicated at 432. In response to indicating VDE (e.g., VDE mechanism) degradation, the controller sets a diagnostic code and notifies the operator of VDE degradation. In one example, a malfunction indicator light (MIL) may be illuminated on a display device located in the passenger compartment of a vehicle. In one example, the diagnostic code may specify which cylinder(s) have degraded cylinder valves. At 434, upon completion of the VDE mechanism diagnostic routine during a DFSO condition, all engine cylinders may be reactivated before fueling is resumed. Since the VDE mechanism is degraded, during the remainder of the drive cycle and during subsequent drive cycles, the engine may be operated with all cylinders active even during conditions when selective deactivation of engine cylinders may be desired.

Alternatively, at 410, the engine may be operating in DFSO mode with all cylinders active. Specifically, as a result of operating in DFSO mode, no fuel may be delivered to any cylinder of the engine, and as a result of operating in non-VDE mode, all cylinder valve mechanisms are active. If all cylinders are active, then at 420, the routine includes measuring the non-VDE exhaust delta pressure ($\Delta$P1, also referred herein as the reference exhaust delta pressure) via the delta pressure sensor coupled across the exhaust particulate filter. In one example, the controller may determine a reference exhaust air flow amount during engine spinning with all cylinders activated (non-VDE) based on the measured exhaust delta pressure ($\Delta$P1). For example, the controller may determine the reference exhaust air flow amount based on a calculation using a look-up table or algorithm with the input being $\Delta$P1 and the output being the reference exhaust air flow amount.

At 422, the routine includes selectively deactivating one or more engine cylinders (entering VDE mode). In one example, the selective deactivation of the cylinders may be carried out within a threshold duration of time after the measurement of the non-VDE exhaust delta pressure ($\Delta$P1) prior to the immediately next engine fueling event. In another example, the selective deactivation of the cylinders may be carried out within a threshold number of engine cycles after the measurement of the non-VDE exhaust delta pressure ($\Delta$P1) prior to the immediately next engine fueling event. During the VDE system diagnostic routine while the engine is operating in DFSO mode, fuel may not be supplied to any of the engine cylinders, and so selective deactivation in the context of the diagnostic routine refers specifically to deactivating cylinders via deactivation of intake valves and exhaust valves coupled to a deactivatable cylinder. In one example, selective deactivation of the cylinders include concurrently deactivating the one or more cylinder valves of each deactivatable cylinder of the engine, the deactivating further including actuating a solenoid coupled to a camshaft to close the one or more cylinder valves of each deactivatable cylinder. In other examples, a subset of the deactivatable cylinders may be deactivated. In alternate embodiments, each engine cylinder may be deactivated independently and singularly. Specifically, an eight-cylinder engine may operate in seven-cylinder mode, six-cylinder mode, five-cylinder-mode, or four-cylinder mode, for example. If the engine is configured to deactivate individual cylinders in this way, then deactivation of a single cylinder as part of the VDE system diagnostic routine may allow for the VDE mechanisms coupled to individual cylinders to be assessed for degradation. Additionally, it may be possible for the VDE system diagnostic routine to deactivate a different permutation of deactivatable cylinders each time the diagnostic is performed, or the controller may selectively deactivate different combinations of cylinders as part of a single diagnostic in response to receiving exhaust air flow measurements that fall outside a specified threshold. By changing which cylinders are deactivated, it may be possible to distinguish specifically which cylinder(s) may have degraded valve functionality.

At 424, the routine includes measuring a VDE exhaust delta pressure ($\Delta$P2) via the delta pressure sensor coupled across the exhaust particulate filter. The delta pressure across the exhaust particulate filter is directly proportional to the exhaust air flow rate via the particulate filter. The VDE exhaust delta pressure measurement may be carried out immediately after the selective deactivation of the deactivatable cylinders. In one example, the VDE exhaust delta pressure measurement may be carried out within a threshold duration of time after the selective deactivation of the engine cylinders. In another example, VDE exhaust delta pressure measurement may be carried out within a threshold number of engine cycles after the selective deactivation of the engine cylinders. The threshold duration and the threshold number of engine cycles may be based on prior calibrations and sample testing carried out prior to vehicle delivery to the operator. In one example, the controller may determine an exhaust air flow amount immediately following the selective deactivation based on the measured exhaust delta pressure ($\Delta P2$). For example, the controller may determine the exhaust air flow amount based on a calculation using a look-up table or algorithm with the input being $\Delta P2$ and the output being the exhaust air flow. As such, after cylinder deactivation, the exhaust air flow amount may decrease due to lack of air flow via the deactivated cylinders. Therefore, exhaust delta pressure ($\Delta P2$) measured after the deactivation may be lower than the reference exhaust delta pressure ($\Delta P1$).

At 426, the routine includes determining if the measured exhaust delta pressure ($\Delta P2$) immediately following the selective deactivation of the engine cylinders is lower than the third threshold pressure. Alternatively, the routine may include determining if the exhaust air flow immediately after the selective deactivation of the cylinders is lower than a third threshold air flow. If it is determined that $\Delta P2$ is lower than the third threshold or if the exhaust air flow amount immediately after the deactivation of the cylinders is lower than the third threshold air flow amount, at 428, no VDE degradation (e.g., VDE mechanism degradation) is indicated, and at 430 the engine may continue operation in DFSO mode before the routine ends. If, at 418, it is determined that $\Delta P2$ is higher than the third threshold or if the exhaust air flow immediately after the deactivation of the cylinders is higher than the third threshold air flow, then VDE degradation is indicated at 432. In response to indicating VDE (e.g., VDE mechanism) degradation, the controller may set a diagnostic code to notify the operator of VDE degradation.

As such, as described in method 300, complete and partial degradation of the VDE mechanism may be differentiated based on comparison of the measured VDE delta pressure ($\Delta P2$) with two separate thresholds. In one example, if it is determined that $\Delta P2$ is higher than the third threshold pressure, it may be inferred that one or more valves coupled to the VDE mechanism is stuck in a completely open position when it is commanded to be closed. In another example, if it is determined that $\Delta P2$ is lower than the third threshold pressure but higher than the fourth threshold pressure, it may be inferred that one or more valves coupled to the VDE mechanism is stuck in a partially open position when it is commanded to be closed. The fourth threshold pressure may correspond to the reference exhaust delta pressure ($\Delta P1$). As such, the fourth threshold may be different from each of the first threshold, the second threshold (used in FIG. 3), and the third threshold. In another example, the fourth threshold may be substantially equal to the second threshold used in FIG. 3.

In this way, it is possible to differentiate between a non-degraded VDE mechanism, a completely degraded VDE mechanism, and a partially degraded VDE mechanism based on delta pressure across the exhaust particulate filter after selective deactivation of one or more cylinder valves being lower than a first threshold, the delta pressure across the exhaust particulate filter being greater than each of a first threshold pressure and a second threshold pressure, and the delta pressure across the exhaust particulate filter being greater than the first threshold pressure and lower than the second threshold pressure, respectively.

FIG. 5 shows an example operating sequence 500 illustrating variable displacement engine (VDE) system diagnostics performed during an ignition-off, fuel-off condition. The horizontal (x-axis) denotes time and the vertical markers t1-t7 identify significant times in the VDE system diagnostic routine.

The first plot, line 502, shows a speed of a vehicle. The second plot, line 504, shows operation of a starter motor coupled to a crankshaft of the vehicle engine. The third plot, line 506, shows engine speed over time. Dashed line 507 shows an engine idling speed. The fourth plot, line 508, shows an active number of cylinders in the VDE engine. The fifth plot, line 510, shows delta pressure across an exhaust particulate filter as estimated via a delta pressure sensor (such as delta pressure sensor 76 in FIG. 2) coupled across the particulate filter. Dashed line 511 shows a first threshold delta pressure above which the VDE mechanism is at least partially degraded. Dashed line 513 shows a second threshold delta pressure above which the VDE mechanism is fully degraded. The sixth plot, line 516, shows a flag indicating VDE mechanism not degraded while dashed line 518 shows a flag indicating VDE mechanism partially degraded, and dotted line 520 shows a flag indicating VDE mechanism completely degraded. The seventh plot, line 522, shows fuel injection to each engine cylinder. The eighth plot, line 524, shows initiation of spark at the end of a compression stroke of each engine cycle.

Prior to time t1, the engine is shut-off (zero engine speed) in a fuel-off, ignition-off condition. In one example, the vehicle may be parked in a garage and the vehicle speed is zero. At time t1, a VDE system diagnostic routine commences (such as VDE system diagnostic routine 300 of FIG. 3). In one example, a vehicle controller (such as controller 12 of FIGS. 1-2) may perform a wake-up function in response to an indication that a sufficient duration has elapsed after an ignition-off request. As a result, the controller may wake-up and initiate the VDE system diagnostic at time t1. In another example, the controller may have received an operator request to start the vehicle remotely at time t1. In the depicted example, the vehicle is not being propelled and so it is unlikely that the operator (e.g., driver) is in the vehicle. At time t1, the starter motor may be activated by the controller in order to crank (e.g., spin) the engine unfueled at the idling speed 507. Between time t1 and t2, no fuel is delivered to any cylinder of the engine and spark is not initiated. It will be appreciated that between t1 and t2, the engine spins unfueled with all eight cylinders activated (non-VDE mode) as shown in plot 508.

In response to cranking (e.g., spinning) the engine from a stopped position at t1, the flow of intake and exhaust gases (air) is initially transient. After a duration of steady engine cranking, this intake and exhaust air flow may transition to a steady state flow. In one example, a specified duration may elapse between time t1 and t2 to allow the exhaust air flow to equilibrate. As discussed previously, the specified time count may allow air flow through the engine to reach steady state and the exhaust air flow to reach equilibrium before recording exhaust air flow measurements that may determine whether VDE degradation has occurred.

At time t2, in response to the exhaust gas flow equilibrating, a delta pressure across the particulate filter is measured to indicate a non-VDE delta pressure. The non-VDE delta pressure corresponds to a exhaust air flow via the particulate filter during engine operation with all cylinders active. After measuring the non-VDE delta pressure, at time t2, the controller selectively deactivates four deactivatable engine cylinders via the VDE mechanism (such as valve actuation systems 151 and 153 in FIG. 2). Assuming that the cylinder valves deactivate as intended, the intake valves coupled to four deactivated cylinders remain closed for their respective intake strokes, and the exhaust valves coupled to the four deactivated cylinders remain closed for their respective exhaust strokes. Between time t2 and t3, the engine is operated with four active cylinders and four deactivated cylinders. This results in the exhaust flow through the exhaust passage decreasing, as exhaust flow is proportional to the number of active cylinders. A decrease in the exhaust flow through the particulate filter results in a lower delta pressure across the particulate filter. Therefore, as seen from plot 510, upon deactivation of the four engine cylinders, the delta pressure across the particulate filter (VDE delta pressure) drops to below the first threshold 511, indicating that the VDE mechanism is not degraded. As an example, the first threshold 511 may be calibrated at time t2 based on the measured non-VDE delta pressure and the number of cylinders deactivated (four in this example).

In one example, if the delta pressure across the particulate filter remains predominantly unchanged between t2 and t3 as shown by dotted plot 514, it may be inferred that the VDE mechanisms may be fully degraded. As such full VDE mechanism degradation may be indicated when the VDE delta pressure across the particulate filter exceeds both the first 511 and second thresholds 513. As an example, the second threshold 513 may be calibrated at time t2 based on the measured non-VDE delta pressure. Specifically, if the delta pressure indication remains predominantly unchanged between t2 and t3, it may be inferred that the intake and exhaust valves of the deactivated cylinders may not be deactivating (e.g., remaining closed) when actuated to do so, and the deactivated cylinder is not being sealed as intended during deactivation. If full degradation of the VDE mechanism is inferred, between time t2 and t3, flag 520 may be raised to indicate a diagnostics code corresponding to full degradation of the VDE mechanism.

In a further example, where the exhaust delta pressure is shown by dashed plot 512, it may be inferred that a portion, but not all of the VDE mechanisms may be degraded. In this example, the VDE delta pressure shown by dashed plot 512 may exceed the first threshold 511 but not the second threshold 513, thereby indicating the VDE mechanism is partially degraded, wherein not all intake and/or exhaust valves are remaining fully closed during deactivation. If partial degradation of the VDE mechanism is inferred, between time t2 and t3, flag 518 may be raised to indicate a diagnostics code corresponding to partial degradation of the VDE mechanism.

At time t3, upon completion of the VDE mechanism diagnostic routine and upon confirmation that the VDE mechanism is not degraded, the controller selectively reactivates the four deactivated cylinders to return the engine to operating with all cylinders active as shown by plot 508. In one example, this may include the controller sending a signal to a camshaft actuator to switch lobes and reactivate previously deactivated cylinder valves.

At time t4, the engine returns to an off condition. The controller sends a signal to the starter motor to switch off the motor and disable engine cranking and consequently the engine speed reduces to zero. Between time t4 and t5, the vehicle is not propelled and the engine is maintained in off condition. In one example, the controller woke-up to perform the VDE system diagnostic between t1 and t4, and once the VDE system diagnostic is completed, the controller returns to sleep mode.

At time t5, in response to an operator key-on, the engine is restarted with all cylinders active and the vehicle is propelled using engine torque. In order to restart the engine, the controller sends a signal to the actuator coupled to the starter motor to crank the engine between time t5 and t6. The engine is cranked with all engine cylinders active. Also, at time t5, fuel is injected to each engine cylinder via one or more fuel injectors and spark is delivered to each cylinder, via a spark plug, at the end of each compression stroke. Between time t5 and t6, based on driver demand, the engine speed and vehicle speed increases. At time t6, in response to the engine speed reaching the idling speed, the starter motor is deactivated and between time t6 and t7 the vehicle is propelled using engine torque. At time t7, in response to a decrease in vehicle speed and a corresponding decrease in torque demand, four deactivatable engine cylinders are deactivated via the VDE mechanism to improve fuel economy and engine efficiency. After time t7, the engine is operated with four active engine cylinders until there is an increase in engine torque demand. However, if it was indicated that the VDE mechanism is fully or partially degraded, even during lower engine torque demand, the engine may be operated with all cylinders active. Therefore in response to indication of VDE mechanism degradation, at time t7, as shown by dashed line 509, the four deactivatable cylinder may not have been deactivated.

FIG. 6 shows an example operating sequence 600 illustrating variable displacement engine (VDE) system diagnostics performed during deceleration fuel shut-off (DFSO) event, the VDE engine coupled to a vehicle. The horizontal (x-axis) denotes time and the vertical markers t1-t4 identify significant times in the VDE system diagnostic routine.

The first plot, line 602, shows an accelerator pedal position as actuated by a vehicle operator. The second plot, line 604, shows an active number of cylinders in the VDE engine. The third plot, line 606, shows a DFSO condition. The fourth plot, line 608, shows delta pressure across an exhaust particulate filter as estimated via a delta pressure sensor (such as delta pressure sensor 76 in FIG. 2) coupled across the particulate filter. Dashed line 611 shows a first threshold delta pressure above which the VDE mechanism is either fully or partially degraded. Dashed line 609 shows a second threshold delta pressure above which the VDE mechanism is fully degraded. The fifth plot, line 614, shows a flag indicating VDE mechanism not degraded while dashed line 615 shows a flag indicating VDE mechanism partially degraded, and dotted line 616 shows a flag indicating VDE mechanism completely degraded.

Prior to time t1, during a tip-in, the engine is operated with eight active cylinders. During this time, the engine is fueled and exhaust delta pressure is estimated via the exhaust pressure sensor coupled across the exhaust particulate filter. At time t1, in response to a decrease in torque demand during a first tip-out, the controller selectively deactivates four deactivatable engine cylinders via a VDE system mechanism in order to operate the engine with four active cylinders. Each of the intake and exhaust valves of the deactivated cylinders are actuated to a closed position and fuel injection to the deactivated cylinders is suspended. Between time t1 and t2, by operating the engine with a decreased number of cylinders, fuel efficiency and emissions quality is improved during the first tip-out. Deactivation of four engine cylinders result in the exhaust flow through the exhaust passage decreasing, exhaust flow being proportional to the number of active cylinders. A decrease in the exhaust flow through the particulate filter results in a lower delta pressure across the particulate filter. Therefore, as seen from plot 608, upon deactivation of the four engine cylinders, the delta pressure across the particulate filter (VDE delta pressure) drops to below the first threshold 608, indicating that the VDE mechanism is not degraded. In response to the indication that the VDE mechanism is not degraded, the flag may be maintained in the off position.

At time t2, in response to a further decrease in engine torque demand during a second tip-out, fuel injection to each of the four active cylinders is disabled and the engine is operated under the DFSO condition. Between time t2 and t3, a steady exhaust pressure is estimated as the four engine cylinders are operated unfueled and four engine cylinders are maintained in a deactivated state. As the engine is operated unfueled, air flows through the engine cylinders and the exhaust passage.

At time t3, in response to the exhaust air flow equilibrating, a delta pressure across the particulate filter is measured to indicate a VDE delta pressure. The VDE delta pressure corresponds to an exhaust air flow via the particulate filter during engine operation with four cylinders active. After measuring the VDE delta pressure, at time t3, in order to diagnose the VDE mechanism (such as valve actuation systems 151 and 153 in FIG. 2), the controller activates four the deactivated engine cylinders via the VDE mechanism. Activation of the engine cylinders include activation of each intake valve and exhaust valve coupled to the activated cylinders while the fuel injectors coupled to each of the activated cylinders are maintained in a deactivate condition. Between time t2 and t3, the engine is operated with eight, unfueled, active cylinders. This results in the air flow through the exhaust passage increasing, as exhaust flow is proportional to the number of active cylinders. An increase in the exhaust air flow through the particulate filter results in a higher delta pressure across the particulate filter. Therefore, as seen from plot 608, upon activation of the four engine cylinders, the delta pressure across the particulate filter (VDE delta pressure) increases to above the first threshold 611, indicating that the VDE mechanism is not degraded. As an example, the first threshold 611 may be calibrated at time t3 based on the measured VDE delta pressure and the number of cylinders re-activated (four in this example).

In one example, if the delta pressure across the particulate filter remains predominantly unchanged between t3 and t4 as shown by dotted plot 612, it may be inferred that the VDE mechanisms may be fully degraded. As such full VDE mechanism degradation may be indicated when the VDE delta pressure across the particulate filter is lower than each of the first threshold 611 and the second threshold 609. As an example, the second threshold 609 may be calibrated at time t3 based on the measured VDE delta pressure. Specifically, if the delta pressure indication remains predominantly unchanged between t3 and t4, it may be inferred that the intake and exhaust valves of the re-activated cylinders may not be activating (such as opening completely) when actuated to do so, and the deactivated cylinder is not being un-sealed as intended during reactivation. If full degradation of the VDE mechanism is inferred, between time t3 and t4, flag 615 may be raised to indicate a diagnostic code corresponding to full degradation of the VDE mechanism.

In a further example, where the exhaust flow is shown by dashed plot 610, it may be inferred that a portion, but not all of the VDE mechanisms may be degraded. In this example, the VDE delta pressure shown by dashed plot 610 may be lower the first threshold 611 but not the second threshold 609, thereby indicating the VDE mechanism is partially degraded, wherein not all intake and/or exhaust valves are fully opening during deactivation. If partial degradation of the VDE mechanism is inferred, between time t3 and t4, flag 616 may be raised to indicate a diagnostic code corresponding to partial degradation of the VDE mechanism.

In this way, by assessing degradation of a cylinder valve actuation mechanism using an existing exhaust delta pressure sensor during non-fueling conditions, the VDE system may be diagnosed without requiring additional costly sensors, such as in-cylinder pressure sensors. The technical effect of comparing delta pressure across an exhaust particulate filter to a plurality of thresholds concurrent to cylinder deactivation valve events is that it is possible to differentiate between a fully degraded VDE system and a partially degraded VDE actuator, enabling specific mitigating actions to be undertaken. By diagnosing the VDE mechanism during vehicle key-off, VDE health monitoring may be carried out opportunistically without affecting drivability and independent of an operator's driving habits.

An example engine method comprises: responsive to a request to diagnose a cylinder valve actuator during a non-fueling condition of the engine, spinning the engine, unfueled, with all cylinders activated to determine a reference air flow amount, and then, selectively deactivating one or more cylinder valves, and indicating cylinder valve actuator degradation based on an air flow amount following the deactivating relative to a threshold, the threshold based on the reference air flow amount. In any preceding example, additionally or optionally, the reference air flow is a reference exhaust air flow and the threshold based on the reference exhaust air flow is one of a first threshold and a second threshold, the first threshold higher than the second threshold. In any or all of the preceding examples, additionally or optionally, the first threshold is further based on a number of cylinders deactivated by deactivating the one or more cylinder valves. In any or all of the preceding examples, additionally or optionally, the air flow amount following the deactivating is an exhaust air flow amount and indicating cylinder valve actuator degradation based on the air flow amount following the deactivating includes one of indicating the one or more cylinder valves stuck in a completely open position when it was commanded to be closed in response to the exhaust air flow amount following the deactivating being higher than the first threshold, and indicating the one or more cylinder valves stuck in a partially open position when it was commanded to be closed in response to the exhaust air flow amount following the deactivating being lower than the first threshold and higher than the second threshold. In any or all of the preceding examples, the method further comprises, additionally or optionally, estimating a degree of opening of the one or more cylinder valves stuck in the partially open position based on a difference between exhaust air flow amount following the deactivating and the second threshold, the degree of opening increasing as the difference decreases. In any or all of the preceding examples, additionally or optionally, the request to diagnose the cylinder valve actuator is received after a threshold duration since an immediately previous request. In any or all of the preceding examples, additionally or optionally, the engine is coupled in a vehicle, and the request is in response to one or more of an engine key-off event in absence of a vehicle occupant, a controller wake-up event following the engine key-off event, and an engine cranking event. In any or all of the preceding examples, additionally or optionally, spinning the engine includes, actuating a starter motor coupled to the engine to crank the engine, unfueled, from rest while the vehicle is not moving. In any or all of the preceding examples, additionally or optionally, spinning the engine further includes spinning the engine at a lower than threshold engine speed with a fully open intake throttle, wherein the threshold engine speed is based on an engine idling speed. In any or all of the preceding examples, additionally or optionally, deactivating one or more cylinder valves includes concurrently deactivating the one or more cylinder valves of each deactivatable cylinder of the engine, the deactivating further including actuating a solenoid coupled to a camshaft to close the one or more cylinder valves of each deactivatable cylinder. In any or all of the preceding examples, the method further comprises, additionally or optionally, responsive to indication of cylinder valve actuator degradation, disabling deactivation of the one or more cylinder valves during subsequent nominal engine operations.

Another engine example method comprises: while an engine is spinning unfueled, actuating an intake valve and an exhaust valve of a cylinder and measuring a first exhaust flow rate through an exhaust particulate filter, then, deactivating the intake valve and the exhaust valve and measuring a second exhaust flow rate through the exhaust particulate filter, and indicating degradation of a cylinder valve deactivation mechanism responsive to the second exhaust flow rate being within a first threshold range of the first exhaust flow rate. In any preceding example, additionally or optionally, spinning the engine unfueled includes cranking the engine from rest via a starter motor. In any or all of the preceding examples, additionally or optionally, spinning the engine unfueled includes spinning the engine during a declaration fuel shut-off (DFSO) event. In any or all of the preceding examples, additionally or optionally, the cylinder valve deactivation mechanism is coupled to each of the intake valve and the exhaust valve and indicating degradation of the cylinder valve deactivation mechanism includes indicating at least one of the intake valve and the exhaust valve being stuck in a fully open position upon deactivation of the corresponding intake valve and the exhaust valve. In any or all of the preceding examples, the method further comprises, additionally or optionally, responsive to each of the second exhaust flow rate being outside the first threshold range of the first exhaust flow rate and the second exhaust flow rate being within a second threshold range of the first exhaust flow rate, indicating at least one of the intake valve and the exhaust valve being stuck in a partially open position upon deactivation of the intake valve and the exhaust valve, the second threshold range larger relative to the first threshold range. In any or all of the preceding examples, additionally or optionally, each of the first exhaust flow rate through the exhaust particulate filter and the second exhaust flow rate through the exhaust particulate filter is measured via a delta pressure sensor coupled across the exhaust particulate filter.

In yet another example, a vehicle system comprises: a vehicle, an engine with a deactivatable cylinder and a non-deactivatable cylinder, a starter motor, each of an intake valve and an exhaust valve coupled to the deactivatable cylinder, each of the intake valve and exhaust valve selectively actuatable via a variable displacement engine (VDE) actuator, one or more fuel injectors coupled to each of the deactivatable cylinder and the non-deactivatable cylinder, an engine intake including an intake throttle, an engine exhaust including a particulate filter coupled to an exhaust passage, and a delta pressure sensor coupled across the particulate filter, and a controller with computer readable instructions stored on non-transitory memory for: rotating each of the deactivatable cylinder and the non-deactivatable cylinder unfueled, estimating a first exhaust pressure across the particulate filter via the delta pressure sensor during the rotating, then deactivating each of the intake valve and the exhaust valve of the deactivatable cylinder via the VDE actuator, estimating a second exhaust pressure across the particulate filter via the delta pressure sensor after the deactivating, and in response to a lower than threshold difference between the second exhaust pressure and the first exhaust pressure, indicating degradation of the VDE actuator. In any preceding example, additionally or optionally, rotating each of the deactivatable cylinder and the non-deactivatable cylinder unfueled includes, during an engine-off condition in absence of a vehicle occupant, waking up the controller and actuating the starter motor to crank each of the deactivatable cylinder and the non-deactivatable cylinder while maintaining the fuel injectors deactivated. In any or all of the preceding examples, additionally or optionally, the controller contains further instructions for: in response to indicating degradation of the VDE actuator, maintaining each of the intake valve and the exhaust valve of the deactivatable cylinder active during subsequent engine operations.

In a further representation, the vehicle is a hybrid vehicle system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system comprising:
an engine with a deactivatable cylinder and a non-deactivatable cylinder;
a starter motor;
each of an intake valve and an exhaust valve coupled to the deactivatable cylinder, each of the intake valve and exhaust valve selectively actuatable via a variable displacement engine (VDE) actuator;
one or more fuel injectors coupled to each of the deactivatable cylinder and the non-deactivatable cylinder;
an engine intake including an intake throttle;
an engine exhaust including a particulate filter coupled to an exhaust passage, and a delta pressure sensor coupled across the particulate filter; and
a controller with computer readable instructions stored on non-transitory memory for:
rotating a crankshaft of the engine with each of the deactivatable cylinder and the non-deactivatable cylinder unfueled;
estimating a first exhaust pressure across the particulate filter via the delta pressure sensor during the rotating;
then deactivating each of the intake valve and the exhaust valve of the deactivatable cylinder via the VDE actuator; and
estimating a second exhaust pressure across the particulate filter via the delta pressure sensor after the deactivating; and in response to a lower than threshold difference between the second exhaust pressure and the first exhaust pressure, indicating degradation of the VDE actuator.

2. The system of claim 1, wherein rotating the crankshaft of the engine with each of the deactivatable cylinder and the non-deactivatable cylinder unfueled includes, during an engine-off condition in absence of a vehicle occupant, waking up the controller and actuating the starter motor to crank the crankshaft while maintaining the fuel injectors for each of the deactivatable cylinder and the non-deactivatable cylinder deactivated.

3. The system of claim 1, wherein the controller contains further instructions for: in response to indicating degradation of the VDE actuator, maintaining each of the intake valve and the exhaust valve of the deactivatable cylinder active during subsequent engine operations.

4. A vehicle system comprising:
a controller with computer readable instructions stored on non-transitory memory for:
rotating a crankshaft of an engine with each of a deactivatable cylinder and a non-deactivatable cylinder of the engine unfueled;
during the rotating, estimating a first exhaust pressure;
then deactivating each of an intake valve and an exhaust valve of the deactivatable cylinder via a variable displacement engine (VDE) actuator;
after the deactivating, estimating a second exhaust pressure; and
in response to a difference between the second exhaust pressure and the first exhaust pressure being lower than a threshold, indicating degradation of the VDE actuator.

5. The system of claim 4, wherein the VDE mechanism selectively actuates each of the intake valve and the exhaust valve of the deactivatable cylinder by actuating a solenoid coupled to a camshaft.

6. The system of claim 4, wherein each of the first exhaust pressure and the second exhaust pressure are estimated across an exhaust particulate filter via a delta pressure sensor coupled across the particulate filter.

7. The system of claim 4, wherein indicating degradation of the VDE actuator further includes indicating a degree of opening of the intake valve and the exhaust valve of the deactivatable cylinder based on the difference between the second exhaust pressure and the first exhaust pressure, the degree of opening increasing as the difference decreases.

8. The system of claim 4, wherein the controller contains further instructions for: in response to indicating degradation of the VDE actuator, maintaining each of the intake valve and the exhaust valve of the deactivatable cylinder active during subsequent engine operations.

9. The system of claim 4, wherein indicating degradation of the VDE actuator includes indicating that the intake valve and the exhaust valve of the deactivatable cylinder is stuck in a completely open position when the intake valve and the exhaust valve were commanded to be closed in response to the difference between the second exhaust pressure and the first exhaust pressure being lower than each of a first threshold and a second threshold.

10. The system of claim 9, wherein indicating degradation of the VDE actuator includes indicating that the intake valve and the exhaust valve of the deactivatable cylinder are stuck in a partially open position when the intake valve and the exhaust valve were commanded to be closed in response to the difference between the second exhaust pressure and the first exhaust pressure being lower than the first threshold and higher than the second threshold, the second threshold lower than the first threshold.

11. The system of claim 4, wherein rotating the crankshaft of the engine with each of the deactivatable cylinder and the non-deactivatable cylinder unfueled includes, during an engine-off condition in absence of a vehicle occupant, waking up the controller and actuating a starter motor to crank the crankshaft while maintaining fuel injectors for each of the deactivatable cylinder and the non-deactivatable cylinder deactivated.

12. The system of claim 11, wherein the rotating the crankshaft of the engine with each of the deactivatable cylinder and the non-deactivatable cylinder unfueled is carried out at a lower than threshold engine speed, the threshold engine speed based on an engine idling speed.

13. The system of claim 11, wherein rotating the crankshaft of the engine with each of the deactivatable cylinder and the non-deactivatable cylinder unfueled is carried out with an intake throttle in a fully open position.

* * * * *